US012424432B2

(12) United States Patent
Park et al.

(10) Patent No.: US 12,424,432 B2
(45) Date of Patent: Sep. 23, 2025

(54) ULTRAVIOLET AND VACUUM ULTRAVIOLET LAMPS DRIVEN BY MOLECULAR-ATOMIC, ATOMIC-ATOMIC, OR ATOMIC-MOLECULAR EXCITATION TRANSFER

(71) Applicants: Eden Park Illumination, Inc., Champaign, IL (US); The Board of Trustees of the University of Illinois, Urbana, IL (US)

(72) Inventors: Sehyun Park, Anyang-si (KR); Sung-Jin Park, Champaign, IL (US); Andrey Mironov, Savoy, IL (US); James Gary Eden, Mahomet, IL (US)

(73) Assignees: EDEN PARK ILLUMINATION, INC., Champaign, IL (US); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 135 days.

(21) Appl. No.: 18/236,568

(22) Filed: Aug. 22, 2023

(65) Prior Publication Data

US 2024/0063012 A1 Feb. 22, 2024

Related U.S. Application Data

(60) Provisional application No. 63/399,876, filed on Aug. 22, 2022.

(51) Int. Cl.

*H01J 61/20* (2006.01)
*H01J 61/06* (2006.01)

(Continued)

(52) U.S. Cl.

CPC .............. *H01J 61/20* (2013.01); *H01J 61/06* (2013.01); *H01J 61/16* (2013.01); *H01J 61/35* (2013.01); *G04F 5/14* (2013.01)

(58) Field of Classification Search

CPC .. H01J 61/20; H01J 61/06; H01J 61/16; H01J 61/35

(Continued)

(56) References Cited

U.S. PATENT DOCUMENTS

| | | | |
|---|---|---|---|
| 7,859,350 | B1 | 12/2010 | Schwindt et al. |
| 8,900,027 | B2 | 12/2014 | Bulson et al. |

(Continued)

OTHER PUBLICATIONS

Park et al. 194 nm microplasma lamps driven by excitation transfer: optical sources for the 199Hg ion atomic clock and photochemistry (Apr. 13, 2022).*

(Continued)

*Primary Examiner* — Christopher M Raabe
(74) *Attorney, Agent, or Firm* — K&L Gates LLP

(57) ABSTRACT

A plasma lamp is provided that employs excitation transfer between two atomic or molecular species so as to preferentially produce light at a specific atomic or molecular emission wavelength. The lamp includes a lamp body. The lamp body includes a top portion, a middle portion having an internal hollow space filled with an energy-donor chemical gas and an energy-acceptor chemical element, and a bottom portion. The lamp body further includes an array of a plurality of cavities connected to the internal hollow space. The internal hollow space and the array of the plurality of cavities are spaced apart from outer surfaces of the lamp body. The plasma lamp is configured to excite the energy-donor chemical gas by an ignition of a low-temperature plasma within the internal hollow space and the array of the plurality of cavities to cause an excitation transfer from the excited energy-donor chemical gas to the energy-acceptor (Continued)

chemical element, thereby emitting radiation having a wavelength of about 194 nm when mercury (Hg) is the energy-acceptor chemical element and helium (He) serves as the donor. Other wavelengths in the ultraviolet (UV) and vacuum ultraviolet (VUV) spectral regions are generated when other donor and acceptor atoms or molecules are employed. These lamps are well-suited as optical drivers for atomic clocks (such as the 40.5 GHz Hg ion clock), photochemical processing of materials, disinfection of water, air, and surfaces, as well as other applications requiring UV or VUV light.

20 Claims, 25 Drawing Sheets

(51) Int. Cl.

*H01J 61/16* (2006.01)
*H01J 61/35* (2006.01)
*G04F 5/14* (2006.01)

(58) Field of Classification Search

USPC .......................................................... 313/639

See application file for complete search history.

(56) References Cited

U.S. PATENT DOCUMENTS

| | | | | |
|---|---|---|---|---|
| 11,004,673 | B2 | 5/2021 | Park et al. | |
| 2012/0319559 | A1* | 12/2012 | Bulson | H01J 9/248 313/485 |
| 2018/0099257 | A1* | 4/2018 | Eden | C01B 13/115 |
| 2019/0214244 | A1* | 7/2019 | Park | H01J 61/025 |
| 2020/0251324 | A1* | 8/2020 | Park | F02M 25/12 |
| 2020/0326305 | A1* | 10/2020 | Ha | H01J 61/09 |

OTHER PUBLICATIONS

Preliminary Report on Patentability for related International Application No. PCT/US2023/030787; action dated Mar. 6, 2025; (15 pages).

Park, et al.; "194 nm microplasma lamps driven by excitation transfer: optical sources for the 199Hg ion atomic clock and photochemistry"; Plasma Sources Science and Technology; vol. 31, No. 4; Apr. 2022; (28 pages).

Park, et al.; "25 W of average power at 172 nm in the vacuum ultraviolet from flat, efficient lamps driven by interlaced arrays of microcavity plasmas"; APL Photonics; vol. 2, Issue 4; Mar. 2017; (7 pages).

* cited by examiner

ULTRAVIOLET AND VACUUM ULTRAVIOLET LAMPS DRIVEN BY MOLECULAR-ATOMIC, ATOMIC-ATOMIC, OR ATOMIC-MOLECULAR EXCITATION TRANSFER

CROSS-REFERENCE TO RELATED APPLICATION

The present application claims priority to U.S. Provisional Application No. 63/399,876 filed Aug. 22, 2022, and entitled “ULTRAVIOLET AND VACUUM ULTRAVIOLET LAMPS DRIVEN BY MOLECULAR-ATOMIC, ATOMIC-ATOMIC, OR ATOMIC-MOLECULAR EXCITATION TRANSFER,” the disclosure of which is incorporated by reference herein in its entirety.

GOVERNMENT RIGHTS IN INVENTION

This invention was made with government support under Jet Propulsion Laboratory (JPL) subcontract Nos. 1562980 and 1613910 awarded by National Aeronautics and Space Administration. The government has certain rights in the invention.

BACKGROUND

Plasma-based lamps have existed for more than 1.5 centuries but many depend on direct electron impact excitation of an atom or molecule to populate the radiating electronic state. This process of a fast electron colliding with an atom or molecule is responsible for many of the most efficient and economically successful lamps, such as neon signs, the fluorescent lamp, and the yellow sodium lamps that light some expressways in the United States. A significant drawback of conventional gas discharge lamps, however, is producing light at shorter wavelengths, such as the deep-ultraviolet (UV) and vacuum ultraviolet (VUV) spectral regions. That is, the process of transferring energy from a fast electron to an atom or molecule is limited in the sense that only the lowest-lying states of the “target” atom or molecule are accessible which, in turn, limits the wavelengths that are available.

Many applications, such as semiconductor device fabrication and optical drivers for atomic clocks, require deep-UV or vacuum UV “light”, but existing sources, such as the hydrogen, deuterium, and rare gas VUV lamps, either do not provide the desired wavelength and spectrum or the radiated power and/or efficiency are unacceptable. (It should be noted that we use the term “light” here to describe UV and VUV radiation for convenience, although this term is generally reserved for visible light). One prominent application requiring VUV light is that of the mercury (Hg) ion atomic clock that requires 194 nm light (6.4 eV photon energy) to drive the clock cycle. The $Hg^+$ (i.e., mercury ion) clock at 40.507 GHz is a promising frequency standard for autonomous navigation, and NASA recently launched a large version of this clock, known as the Deep Space Clock, for space navigation and communications purposes. However, the only lamp previously available to drive this clock is a large argon/mercury, inductively-coupled lamp that is inefficient and bulky. Other applications for VUV light, such as photopolymerization (i.e., polymerization with light), the generation of ozone, and disinfection of air and water similarly require compact, powerful sources that have not existed in the past.

SUMMARY

The present disclosure provides a new and innovative microplasma-based lamp driven by molecular-atomic or atomic-atomic excitation transfer. These lamps are capable of efficiently generating light in the visible, UV, and VUV spectral regions because they are based on the transfer of energy from a molecule (or atom) to a different atomic or molecular species through a collision in the gas phase. An exemplary plasma lamp may include a lamp body which includes a top portion, a middle portion having an internal hollow space filled with an energy-“donor” gas (or vapor) and an energy-“acceptor” chemical element (also a gas or vapor), and a bottom portion. The lamp body may further include a plurality of microcavities situated within the internal hollow space. The internal hollow space and the array of the plurality of cavities may be spaced apart from outer surfaces of the lamp body. The plasma lamp may be configured to excite the energy-donor gas or vapor by the generation of microplasmas within the plurality of microcavities which results in the transfer of energy from the donor atomic or molecular species (A) to a second, acceptor, atom or molecule (B). The collisional process responsible for energy transfer from species A to B may proceed at a rate that is at least proportional to the background gas pressure. Accordingly, the gas pressure within the lamp may typically be greater than 300 Torr (where 1 atmosphere is approximately equal to 760 Torr) and an internal lamp pressure beyond 1 atmosphere may be desirable.

In some examples, the plasma lamp may further include a gas feed connection configured to supply the donor and acceptor gas(es) or vapor(s) to the lamp. This connection may also be sealed after the gas and/or vapor is introduced into the lamp.

In some examples, the lamp body may be sealed with a sealing material. The sealing material may include glass frit.

In some examples, the array of a plurality of cavities may include a first group of cavities and a second group of cavities, and the first group of cavities has a first width and the second group of cavities has a second width, which is greater than the first width.

In some examples, the donor gas may be helium (He), neon (Ne), or argon (Ar).

In some examples, the acceptor species may include mercury, cadmium, zinc, phosphorus, selenium, lithium, sodium, potassium, rubidium, cesium, Francium, iodine, bromine, or sulfur vapor, and/or nitrogen ($N_2$) or oxygen ($O_2$) gas.

In some examples, the pressure of the donor (or “background”) gas may be in the range of about 50 Torr to about 3000 Torr (approximately 4 atmospheres).

In some examples, the ratio of the partial pressure of the donor gas or vapor to that for the acceptor gas or vapor is greater than ten.

In some examples, the plasma lamp may include a pair of electrodes to generate the plasma.

In some examples, the pair of electrodes and associated power supply may be configured to apply a sinusoidal, bipolar, or unipolar voltage pulse having a pulse width in a range of about 10 ns to several microseconds.

In some examples, a rise and/or fall time of the voltage pulse may be less than about 150 ns.

In some examples, the first electrode may be disposed in the top portion of the lamp and the second electrode may be disposed in the bottom portion.

In some examples, the first electrode may be disposed in the middle portion and the second electrode may be disposed in the bottom portion, where the first electrode may include a mesh electrode.

In some examples, the plasma lamp may further include a mesh electrode disposed in the middle portion.

In some examples, an interior surface of the lamp body may be coated with a coating material, and the coating material may include at least one of $Al_2O_3$ and $AlN_xO_y$, diamond-like carbon, and polycrystalline diamond.

In some examples, the array of the plurality of cavities may be disposed in the bottom portion of the lamp body.

In some examples, the plasma lamp may further include an outer hollow space surrounding the internal hollow space. The trench hollow space may be filled with one or more gases so as to compensate for diffusion through the inner wall of the lamp. A pressure of the gas within the outer hollow space is typically greater than the combined pressure of the gas(es) and vapor(s) within the internal hollow space.

In some examples, at least one of the top portion, the middle portion, and the bottom portion may be made of fused silica, quartz, sapphire, or polycrystalline alumina.

Another example of a plasma lamp may include a lamp body having an internal hollow space filled with a donor gas/vapor and an acceptor gas/vapor, and an array of a plurality of cavities situated within the internal hollow space. The internal hollow space and the array of the plurality of cavities may be spaced apart from outer surfaces of the lamp body. The plasma lamp may be configured so as to primarily excite the donor gas by the microplasmas generated within microcavities in the internal hollow space. This is accomplished by ensuring that the partial pressure of the donor gas or vapor is larger than the partial pressure of the acceptor gas or vapor. The ratio of the donor to acceptor gas/vapor partial pressures is generally chosen to be greater than 10:1 and can reach 5000:1, depending on the donor and acceptor chosen for a particular application. Consequently, the preponderance the power deposited into the vapor/gas mixture by the microplasmas initially enters the donor atom or molecule, producing excited species in various electronic states. Collisions of the excited donor species with acceptor atoms or molecules results in the transfer of energy from specific excited states of the donor to specific excited states of the acceptor atom or molecule. The production of electronically-excited and/or ionized acceptor species by the excitation transfer collision culminates in the emission of photons by the acceptor atoms or molecules at wavelength (s) required for specific applications such as an atomic clock.

In some examples, the plasma lamp serves as the optical driver for an atomic clock. The atomic clock may, for example, be an ion clock which includes optics configured to collimate the radiation from the plasma lamp and deliver the collimated radiation to an ion cloud located within a separate chamber.

In some examples, a method of manufacturing a plasma lamp is provided. The method may include providing a top portion of a lamp body of the plasma lamp, providing a middle portion of the lamp body, the middle portion including an internal hollow space, providing a bottom portion of the lamp body, the lamp body further including an array of microcavities situated within the internal hollow space, assembling the top portion, the middle portion, and the bottom portion together to form the lamp body, and supplying a donor gas/vapor and acceptor gas/vapor to the internal hollow space in the assembled lamp body. The internal hollow space and the array of microcavities may be spaced apart from outer surfaces of the lamp body. The plasma lamp may be configured to excite the donor gas by the generation of microplasmas within the internal hollow space so as to result in excitation transfer from the donor atom or molecular species gas to the atomic or molecular acceptor which may subsequently emit the desired wavelength(s) of light.

In some examples, any of the structure and functionality described above may be used in combination with any of the other structure and functionality described above and with any one or more of the preceding examples.

Additional features and advantages of the disclosed methods and system are described in, and will be apparent from, the following Detailed Description and Figures.

BRIEF DESCRIPTION OF THE FIGURES

FIG. 6(*b*) illustrates the relative emission intensity from the Hg ion at 194.2 nm as the driving voltage is varied. The inset is an expanded view of the early portion of the 194 nm fluorescence waveform.

FIG. 10(*b*) is an illustration of the trajectory of mercury ions near a (mesh) electrode in the example plasma lamp of FIG. 10(*a*).

FIG. 10(*c*) is a photograph of a plasma lamp with a mesh electrode according to the present disclosure.

FIG. 11(*b*) illustrates a rear view of the ring-electrode lamp of FIG. 11(*a*)

FIG. 11(*c*) illustrates a top view of the ring-electrode lamp of FIG. 11(*a*) in operation, viewed through the front window.

FIG. 13(*b*) illustrates a side view of a schematic of the plasma lamp and the collimating optical body component of FIG. 13(*a*) by which the VUV light emitted from the plasma lamp is collimated and directed to the Hg ion cloud in the trap of an atomic clock.

FIG. 15(*b*) is a side view of the plasma lamp of FIG. 16(*a*).

DETAILED DESCRIPTION OF EXAMPLE EMBODIMENTS

Figure 1:
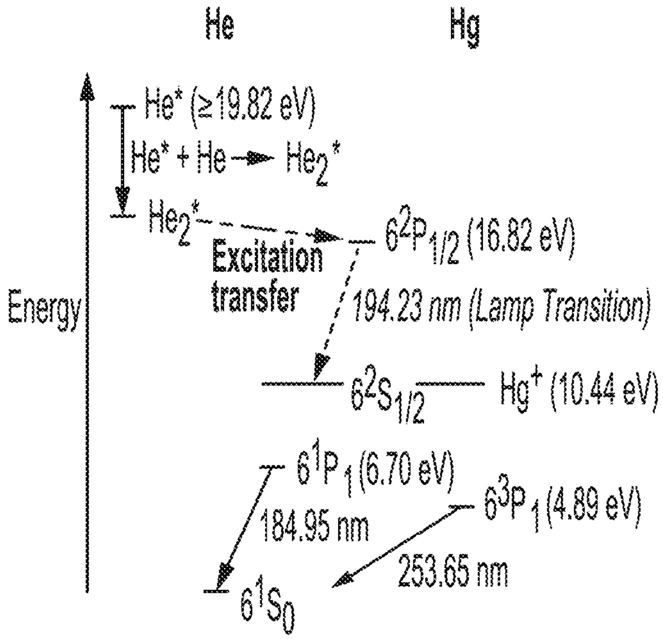
FIG. 1 is a partial energy level diagram of helium and mercury, illustrating the relevant electronic states of Hg, $Hg^+$, He, and Het that participate in the transfer of energy from He atomic excited states to a specific state of the Hg ion.

The present disclosure provides a new class of ultraviolet and vacuum ultraviolet (UV and VUV, respectively) lamps providing emission wavelengths and more radiated power per unit volume than has been possible in the past. Because these microplasma-based lamps can be miniaturized, they provide access to new products and photochemical processes, such as compact atomic clocks and environmental sensors. For example, aspects of the present disclosure provide a miniature lamp that emits the 194 nm radiation required for driving the mercury ion (Hg+) atomic clock. This atomic clock is a next-generation clock for space navigation and telecommunications, for example. Atomic clocks typically may require an optical source to drive the lamp. Lasers are generally preferred optical sources for clocks, but laser systems operating at 194.2 nm (the required wavelength for the Hg ion clock) are currently bulky and expensive. Previous Hg ion lamps, therefore, have employed a plasma lamp but prior art lamps have been based on the RF-excitation of a low-pressure mixture of argon (Ar) and Hg. The size of such lamps and their associated power supplies is problematic because most applications envisioned for the Hg ion (and other) atomic clocks require miniaturization and a significant reduction in power consumption. (Further details can be found in: T. M. Hoag et al., Scientific Reports 13, 10629 (2023)).

Aspects of the present disclosure provide a microplasma lamp that can be miniaturized (e.g., active volumes as small as 0.25 cc) while producing at least the same radiant power output as conventional lamps that are more than an order of magnitude larger in volume than the lamps described here. The applications for the microplasma lamps of the present disclosure may extend well beyond space. The Hg ion atomic clock, for example, may be of considerable terrestrial interest because its stability (accuracy) appears to be at least an order of magnitude better than that for the rubidium (Rb) and cesium (Cs) clocks that have already been commercialized. Such clocks are the foundation of the Global Positioning System (GPS) and, indeed, all consumer, commercial, and military systems that require precise time and frequency standards. It is likely, for example, that every autonomous vehicle in the future may require an onboard atomic clock. Such vehicles at present rely on GPS for navigation but the precision available at present is unacceptable for reliable navigation in urban environments, for example, where the positional accuracy may need to be better than 1 cm. All clocks developed to date may be too large, unwieldy, and expensive to provide a solution in this market, but the ability of the lamps described here to: (i) reduce lamp volume while preserving or improving output power at a particular wavelength, and (ii) produce microplasmas with any of several electrode configurations and ultra-compact, fast-risetime power supplies is expected to open the door to a variety of commercial applications. Furthermore, the atomic clocks responsible for the positioning of communications satellites in networks and the navigation of interplanetary vehicles must be more precise, smaller, and lighter than those available in the past.

Aspects of the present disclosure provide microplasma lamps for which the volume of the lamp can be 1-2 orders of magnitude lower than that of conventional lamps. In short, the present disclosure provides an approach to efficiently producing UV or VUV radiation from miniature lamps. The market for atomic clocks for autonomous vehicles, for example, may await the introduction of clocks having performance superior to that of Rb or Cs clocks and at a fraction of the cost. “Low-end” Rb clocks are currently available for ~$1500, a value that must fall by a factor of 5-10 (or more) in order for such clocks to be installed in vehicles on a large scale. The miniature lamps of the present disclosure are the first step in that direction, by reducing the size and weight of the optical driver itself while simultaneously improving is precision. The remainder of the atomic clock can also be miniaturized by microfabrication.

Other promising applications of the lamps disclosed here include environmental sensors and the photochemical deposition of electronic or optical thin films. With regard to the former, aspects of the present disclosure may provide a microplasma lamp radiating efficiently at wavelengths below 150 nm which are suitable for environmental sensors. At (and below) this wavelength, photons are able to photoionize almost all known molecules, including atmospheric pollutants (nitrous oxide, carbon monoxide, etc.). Once an electron is freed from a molecule by photoionization, the energy of that electron can be measured and the parent molecule identified. Such compact sensors distributed throughout a city may provide a dynamic network for monitoring air quality in real time.

In summary, aspects of the present disclosure provide an unprecedented type of lamp that emits short wavelength (UV and/or VUV) radiation efficiently by introducing a new atomic/molecular mechanism for driving the lamp emission. As one example, when helium is employed as a buffer (background) gas in the lamp, energy transfer from an excited helium dimer (the $He_2$* molecule), known as the donor species, to a neutral mercury atom (the acceptor species) populates specific excited states of the mercury ion that emit VUV radiation. This process is known to be efficient because, through a judicious choice of both the donor and acceptor, the energy of the donor atom or molecule either matches or is slightly larger than that for the desired acceptor state. In this situation, the transfer of energy between the donor and acceptor is said to be resonant or near-resonant. Although the discussion to follow focusses on lamps based the transfer of energy from atomic or molecular He (i.e., He* or $He_2$*, respectively), it must be emphasized that the mechanism for driving the lamp is quite general and stands in contrast to conventional discharge lamps which are generally excited solely by direct impact excitation of the radiating species. Examples of other lamp acceptors that may be driven by excitation transfer include, cadmium, zinc, phosphorus, selenium, lithium, sodium, potassium, rubidium, cesium, francium, sulfur, oxygen, iodine, bromine, carbon disulfide, sulfur dioxide, ammonia, and other acceptor atoms and molecules.

Aspects of the present disclosure employ excitation transfer phenomena, in which energy is delivered to the desired atomic or molecular radiating state by a donor atom or molecule that is efficiently excited by the high pressure, glow discharge produced by one or more arrays of microplasmas. This excitation transfer process can be represented as: $A^*+B \rightarrow B^*$ (or $B+^*$)+A, where A and B are atoms or molecules, an asterisk denotes an excited state of an atom or molecule, and A* is excited by direct electron impact. Until recently, it has not been possible to produce a glow discharge at high pressure in a lamp. As an example, the xenon dimer ($Xe_2$*) lamp has been available commercially for several decades and this lamp requires the production of plasma within a quartz or silica envelope containing Xe gas at near-atmospheric pressures. However, the discharge created in such lamps is not a "glow" discharge but rather is dominated by streamers (similar to an electrical arc). Consequently, all commercialized lamps in the past have fallen into one of two categories: 1) low pressure, glow discharge lamps, and 2) high pressure arc lamps. Examples of #1 may include Hg fluorescent and germicidal lamps and neon signs, whereas Hg and sodium street lamps are the most prominent examples of category #2. The difficulty with both types of lamps is that states of low energy (typically less than 5-7 eV) can be populated efficiently and, therefore, obtaining significant power occurs only from states radiating in the visible to mid-UV (such as 254 nm in neutral mercury). However, obtaining significant power from neutral or ionized states lying above ~5 eV is challenging. It should, however, be mentioned that microplasma lamps have been commercially available for nearly a decade and these emit visible, UV, and VUV light from diatomic and triatomic molecules containing at least one rare gas atom. That is, the desired emitter (a rare gas dimer or rare gas-halide molecule, for example) is generated with a plasma by direct electron impact excitation of a rare-gas atom, followed by a collision such as the "harpoon" collision that produces the desired molecular emitter. The emitting states are invariably the lowest-lying excited states of the molecule. The present disclosure, however, introduces excitation transfer as a mechanism for driving the lamp. The selectivity in the state of the acceptor that is produced by the excitation transfer process allows for ionic states and highly-lying states of atoms and molecules to be produced efficiently in the lamps. This capability has not existed previously.

The discussion to follow is directed to excitation transfer in microplasmas produced in He/Hg mixtures, but the results are applicable to a wide range of binary or ternary (three component) gas/vapor mixtures. FIG. 1 is a partial energy level diagram of atomic helium (He), the dimer $He_2$, and Hg that illustrates the impact that excitation transfer has on a Hg ion lamp according to the present disclosure. Of primary importance is that the 194.2 nm (VUV) transition required for the Hg ion clock lies 16.82 eV above the ground state of neutral atomic mercury. For that reason, if one attempts to populate the upper state of the 194.2 nm transition directly by electron impact excitation, little of the discharge power will be delivered to that upper state. In other words, direct electron impact excitation of the Hg ion $6^2P_{1/2}$ state (and other high-lying states) is, to put it mildly, inefficient. However, introducing He into the gas mixture within the lamp allows one to bypass the lower excited states of Hg. Specifically, if He is the majority constituent of the gas mixture in a microplasma, then a significant portion of the electrical power delivered to the plasma will reside in the lowest excited states of He, denoted He*. Because the microplasma accommodates high gas pressures while still producing a glow discharge, the He pressure may be several hundred Torr (room temperature pressure) and as much as several atmospheres. At such pressures, the He* excited species are rapidly converted to the excimer molecule, $He_2$*. It should be noted that the latter process (known as a three-body collision) has been shown to be important because the energy of the $He_2$* state of FIG. 1 is closer in energy to the energy of the Hg ion states that we wish to populate. Furthermore, the production of $He_2$* in any significant quantities is not possible with the low pressure macroscopic discharges (typically, less than 10 Torr) that have been applied in the past to generate 194.2 nm emission. The red arrow in FIG. 1 indicates the excitation transfer process in which energy is transferred from the $He_2$* molecule to the $Hg^+$ ($6^2P_{1/2}$) state, and the yellow arrow indicates the Hg ion optical transition that produces the desired VUV radiation.

Optical tests show that, in microplasma lamps having a mixture of He and Hg vapor, the 194.2 nm light that is attributable to direct electron impact excitation or ionization of Hg is <1% of that produced by the $He_2^* \rightarrow Hg^+$ ($6^2P_{1/2}$) excitation transfer process described above.

A key aspect of the present disclosure is the use of microplasmas which enable the production of uniform, glow plasmas at pressures up to and beyond 1 atmosphere (1 atm). Microplasma arrays are capable of generating spatially uniform plasmas in a variety of atomic and molecular gases and vapors, which suggests the versatility of the processes described here. Helium or another rare gas is generally the majority constituent of the gas mixture but other gases (such as oxygen, sulfur or polyatomic gases such as ammonia) may also serve as the acceptor gas or vapor for some applications. The pressure of the majority constituent of the gas mixture is (typically) several hundred Torr to at least 3000 Torr (approximately 4 atm).

In some examples, a small amount of liquid Hg or a eutectic of Hg (typically a few mg of Hg) is introduced to the lamp. If He gas is the donor species, the ignition of a plasma within and/or outside microcavities in the lamp, which will be discussed in detail below, the generation of microplasmas in one or more microcavities in the lamp will efficiently produce electronically-excited He states which quickly convert to the lowest-lying states of $He_2$*, known as the He excimer, through three-body collisions. As shown in FIG. 1, the energies of the lowest $He_2$* states lie close to the energy of electronic states of the Hg ion, and the $6^2P_{1/2}$ state, in particular, that lies at 16.8 eV. Populating this Hg ion state in a low-pressure glow discharge by direct electron impact is known to be inefficient because of the mercury atomic states lying between ground and the desired state. That is, in low pressure glow discharges, the steady-state populations of excited states of Hg, for example, or any atom tend to drop monotonically with increasing energy. Consequently, it is generally not possible to selectively or predominantly populate a state of the atom that is highly excited (i.e., lies at energies well above the lowest-lying states) However, the coincidence of the He dimer state energy with several Hg ion excited states results in the selective transfer of power to a small number of $(Hg^+)^*$ states by a collision between the acceptor and donor species. Consequently, the process of FIG. 1 is broad in scope and, thus, the excitation transfer process between He and $Hg^+$ is discussed only as an example. Therefore, other pairs of atoms and molecules, such as nitrogen, oxygen, the rare gases, Cd, Zn, the alkalis (Li, Na, K, Rb, and Cs), and molecules such as the oxides of carbon and sulfur may, depending upon the application, be chosen by one skilled in the art.

Figure 2:
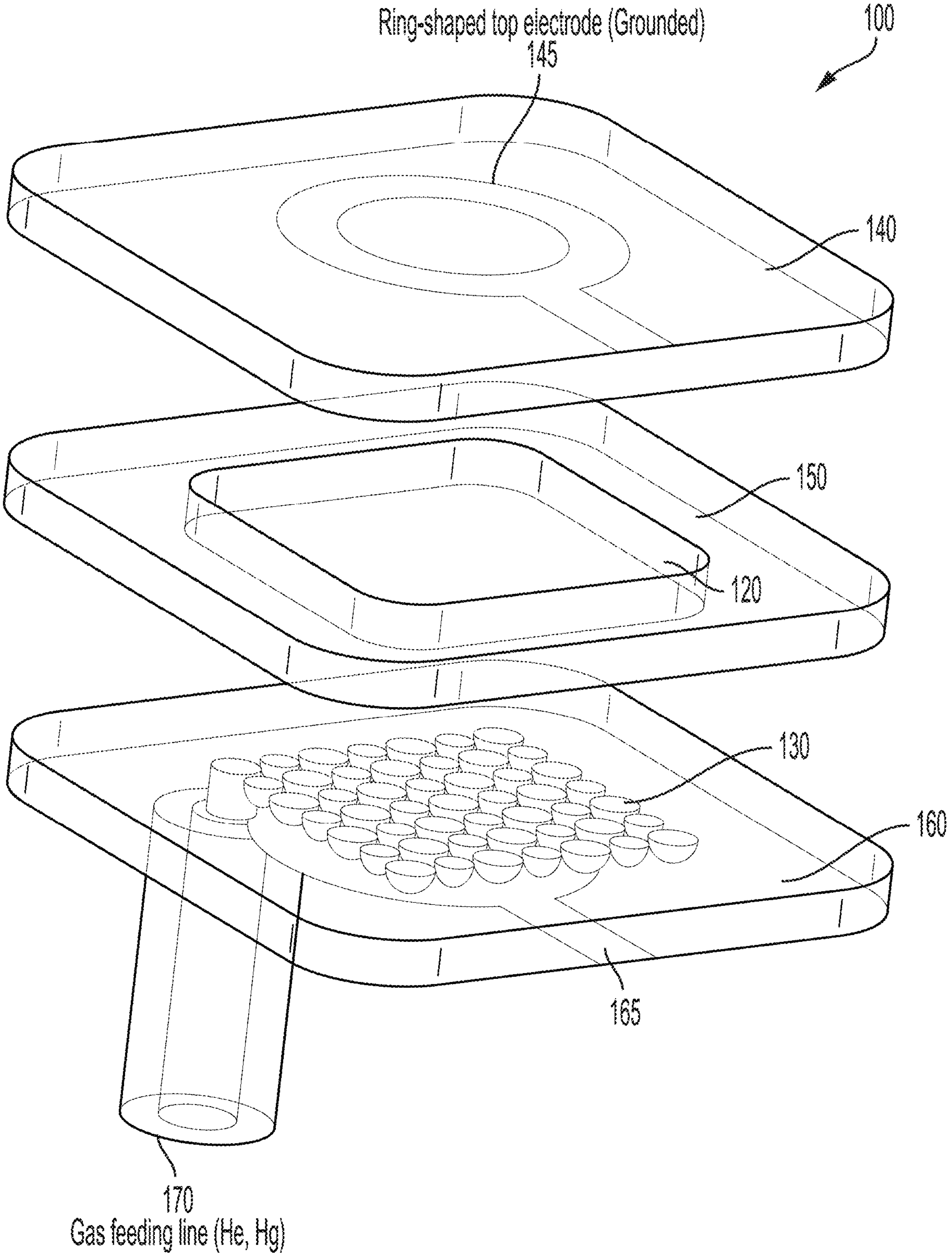
FIG. 2 is a perspective, exploded view of a schematic diagram of an example plasma lamp according to the present disclosure.
Figure 3:
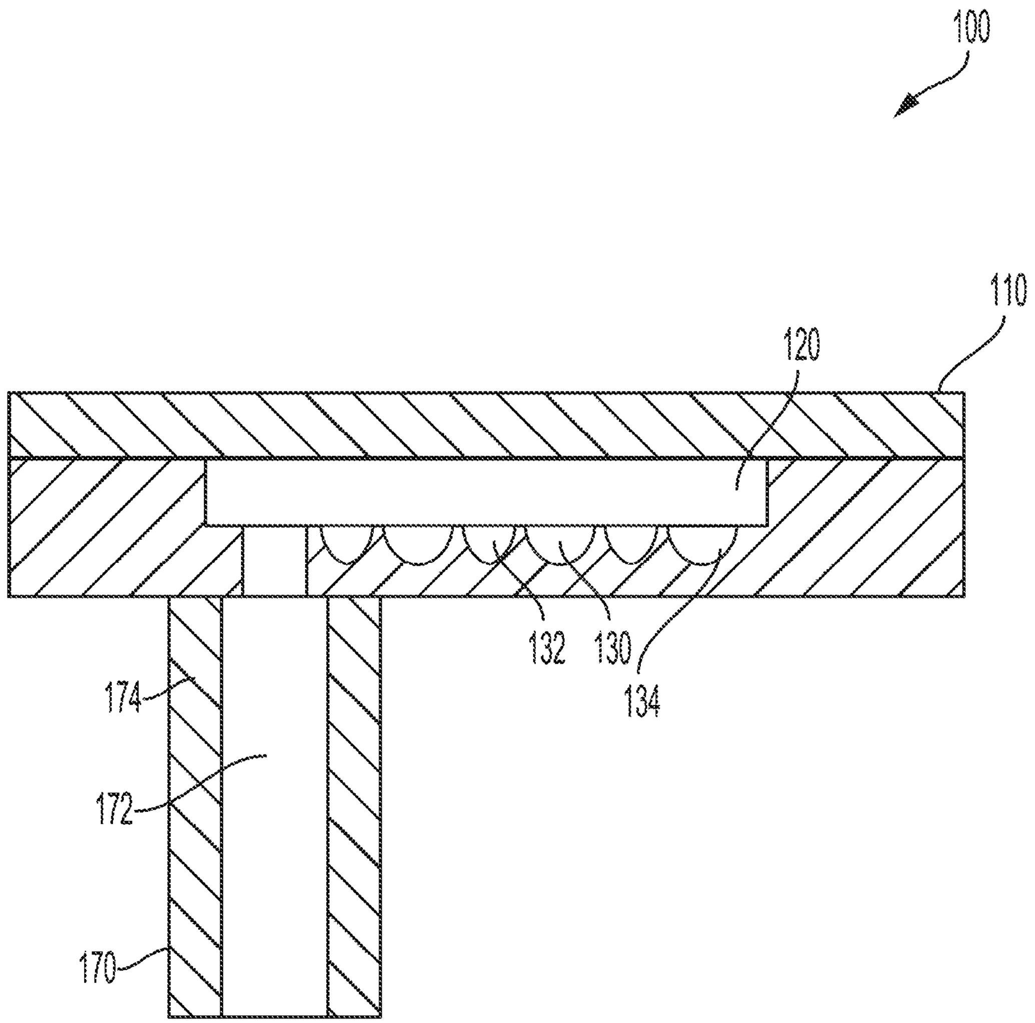
FIG. 3 is a cross-sectional view of the schematic of the plasma lamp of FIG. 2.
Figure 4:
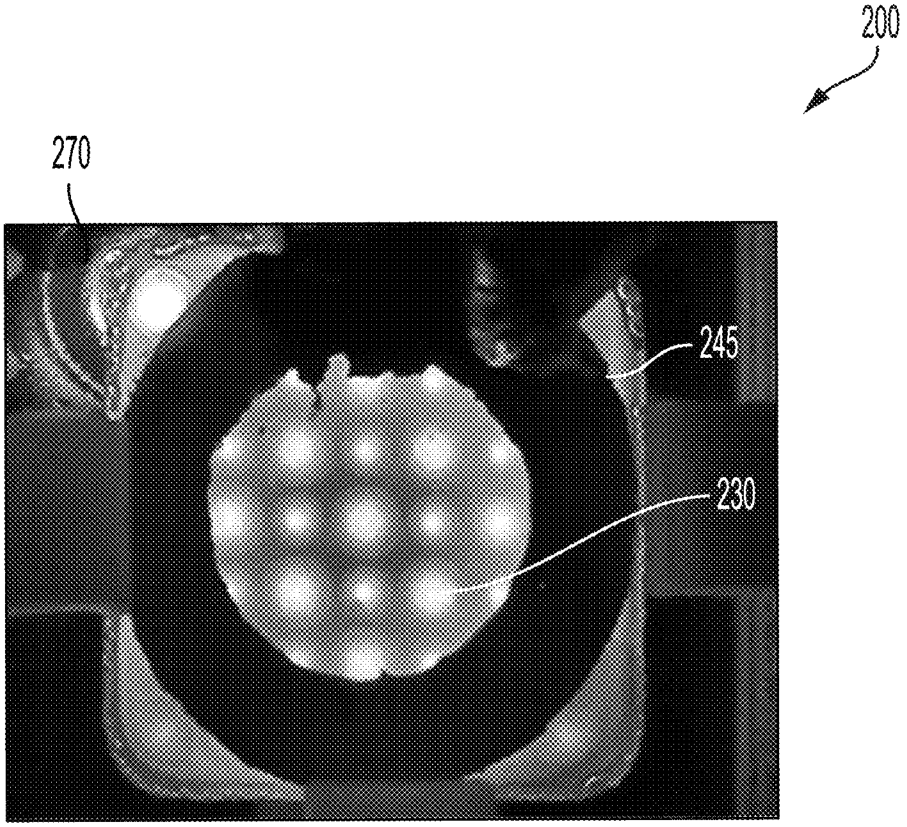
FIG. 4 is a top view of a plasma lamp according to the present disclosure.

Referring to FIGS. 2 to 4, a plasma lamp 100 according to an example of the present disclosure is provided. The dimension(s) given for any component illustrated in FIG. 3 is given only as an example, and the dimension(s) of each component is not limited thereto, as discussed in detail below. The plasma lamp 100 may include a lamp body 110.

The lamp body 110 may include an internal space 120 and an array of a plurality of cavities 130 situated within the internal space 120. This internal space 120 contains at least one array of microcavities 130 and is otherwise filled with both a donor gas or vapor and an acceptor gas or vapor. The lamp body 110 may include at least one optical window (the first window 140) through which the desired lamp radiation is able to pass. The material from which the window is fabricated is determined by the wavelength that one wishes to transmit. For wavelengths as short as ~170 nm, high quality fused silica or sapphire is generally acceptable but shorter lamp emission wavelengths may require magnesium fluoride or lithium fluoride. The microcavities 130 may be formed in the interior face of a second window 160 sealed to the lamp body 110 or, alternatively, the microcavities 130 may be fabricated into one or more surfaces situated within the lamp body 110. The microcavities themselves may typically be cylindrical in geometry and range in diameter from approximately 50 um to approximately 1 mm. As a general rule, the diameter of the microcavities 130 decreases as the intended gas pressure(s) within the lamp body increases. The microcavity cross-section can also take on different geometries such as square, rectangular, and elliptical.

In some examples, the lamp body 110 may include a top portion 140, a middle portion 150, and a bottom portion 160. In some examples, the middle portion 150 may include the internal hollow space 120 filled with the energy-donor chemical gas as well as the energy-acceptor chemical element. In some examples, the top portion 140 may be the optical window described above. In some examples, the middle portion 150 may be a separate spacer that may serve to separate the top portion 140 and the bottom portion 160 of the lamp. The bottom portion of the lamp may be a second window (described above) or it may serve as a reflector of the desired light emission generated by the microcavity array. Alternatively, the bottom portion may provide the surface in which the microcavity array is fabricated.

In some examples, at least one of the top portion 140, the middle portion 150, and the bottom portion 160 may be made from fused silica, sapphire, magnesium fluoride, calcium fluoride or quartz, all of which are transparent to the 194 nm emission of the Hg ion. The choice of the window material depends on the wavelength of the emission (light) that one wishes to extract from the lamp. One skilled in the art of optical materials is familiar with the materials currently available for efficiently transmitting deep-UV or VUV light, and examples include $MgF_2$ for wavelengths below ~170 nm and as low as ~120 nm.

In some examples, the plasma lamp 100 may further include a gas feed line connection 170 which is configured to supply one or both of the donor and acceptor gas(es) or vapor(s) to the internal space 120 and/or the one or more arrays of cavities 130. In other examples, the donor and acceptor gases or vapors can be supplied to the internal hollow space 120 and/or the array(s) of cavities 130 by sealing the lamp in a chamber containing the desired gas mixture. That is, the first optical window, for example, may be sealed to the remainder of the lamp while the lamp is immersed in the gas mixture of interest. This process may eliminate the need for a gas feed line. Otherwise, the gas feed line may be required and can be made from any suitable material. Also, the gas feed line may be "sealed off" after the gas mixture has been introduced into the lamp at the proper pressure. Furthermore, a getter (e.g., those manufactured by SAES) may also be situated within the lamp for the purpose of purifying one or more of the gases after the lamp is sealed. The pressure within the lamp is generally dependent upon the microcavity diameters and the specific excitation transfer process chosen for the lamp. For example, for the three-body process responsible for the $He_2^* \rightarrow Hg^+$ $(6^2P_{1/2})$ excitation process that selectively produces VUV radiation from Hg at 194 nm, the highest pressure at which glow discharges can be generated in He is desirable because the rate of formation of the Het excited molecule scales as the square of the He pressure. Consequently, the He pressure may be as low as several hundred Torr but can be as large as 1-4 atmospheres.

The lamp body 110 may be sealed with a material capable of making a "hard seal" that is capable of withstanding temperatures of at least 300° C. and yet has a low outgassing rate. Most of the lamps fabricated and tested to date have been sealed by a glass frit.

In some examples, the array of a plurality of cavities 130 may include a first group of cavities 132 and a second group of cavities 134. If the microcavities may be cylindrical and the microcavity diameters may be the same within a group of cavities, then the ratio of the larger cavity diameters to those for the smaller cavities may range from 4:1 to 1.5:1. The purpose for the inclusion of two or more sets of microcavities is primarily to better utilize the power pulse (V×I) delivered to the lamp by the power supply.

The characteristic dimension of the microcavity cross-section (i.e., diameter of a cylinder, side of a square, etc.), and the depths of the microcavities, are typically in the range of 10 μm to 1 mm.

In some examples, the array of the plurality of cavities 130 may be disposed in the bottom portion 160 of the lamp body 110. In other examples, the array of the plurality of cavities 130 may be disposed in any other suitable portion of the lamp body 110 (e.g., middle portion 150). In some examples, the array(s) of the cavities 130 may be formed through a laser. In other examples, the array(s) of the cavities 130 may be formed through any other suitable means (e.g., physical ablation, including micropowder or nanopowder ablation).

Delivering electrical power to the microcavity array(s) may require electrode or electrode arrays which can take on a variety of forms. The lamps fabricated to date have generally had electrodes formed on the exterior of the lamp body which is fabricated from fused silica. These electrodes are metallic rings, one near each end of the cylindrical body, or metallic girds comprising fine lines that are evaporated onto at least the first optical window. In some embodiments, fine metallic line (mesh) electrodes are also deposited onto a rear window by evaporation. If the electrodes are located outside the lamp, the voltage driving the microcavity plasmas within the lamp may need to be time-varying. The risetime of the voltage driving the lamp must generally be <200 ns and, preferably, <100 ns for maximum lamp efficiency.

Figure 5:
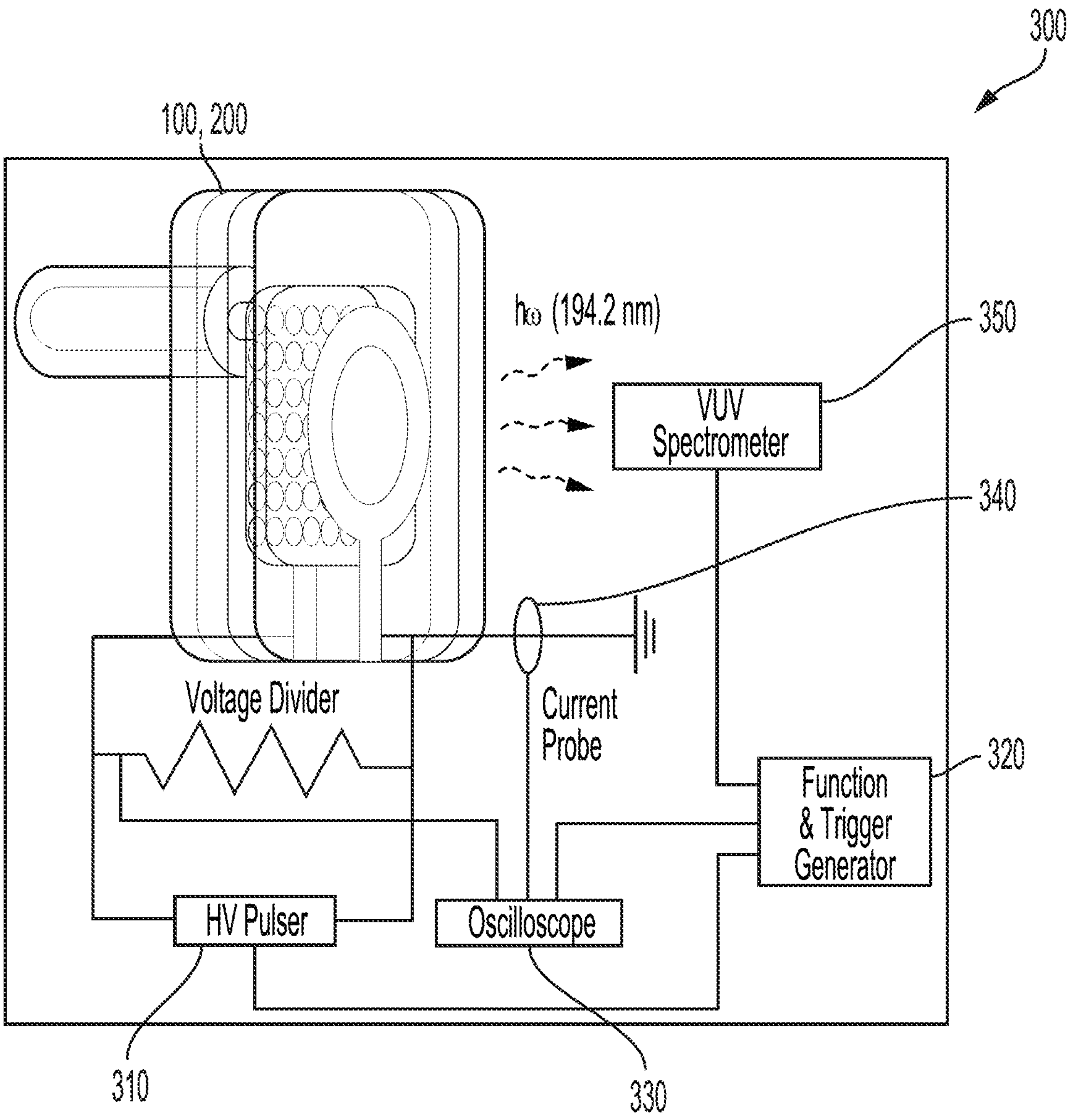
FIG. 5 is a schematic diagram of an experimental arrangement that measures the waveforms for the voltage, current, and emission intensity of an example plasma lamp according to the present disclosure.

FIG. 4 shows a top view of a plasma lamp 200 according to the present disclosure, while the plasma lamp 200 is in operation. In this example, the plasma lamp 200 contains 300 Torr of helium and a few milligrams of the $^{202}Hg$ isotope. The array of cavities 230 can be clearly seen in the image as well as the grounded, ring-shaped electrode 245. FIG. 5 depicts the experimental arrangement 300 for driving and testing one or more plasma lamps 100, 200 according to the present disclosure so as to measure the waveforms for the voltage, current, and emission intensity. A high voltage pulser (e.g., PVX-4110, Directed Energy) 310 provides a voltage pulse having a width as short as 200 ns and an amplitude as large as 10 kV. The rise/fall time of the voltage pulse is approximately 50 ns. The pulse shape and the pulse repetition frequency of the pulsed voltage supply may be modulated by a function generator 320. Both the current and the voltage waveforms are monitored by an oscilloscope 330 with probes 340, and the temporally-resolved spectrum of the lamp emission lines was recorded with a VUV spectrometer 350 (e.g., Model SP2758, Princeton Instruments) equipped with an intensified CCD (ICCD) camera (PI-MAX4, Princeton Instruments).

Figure 6A:
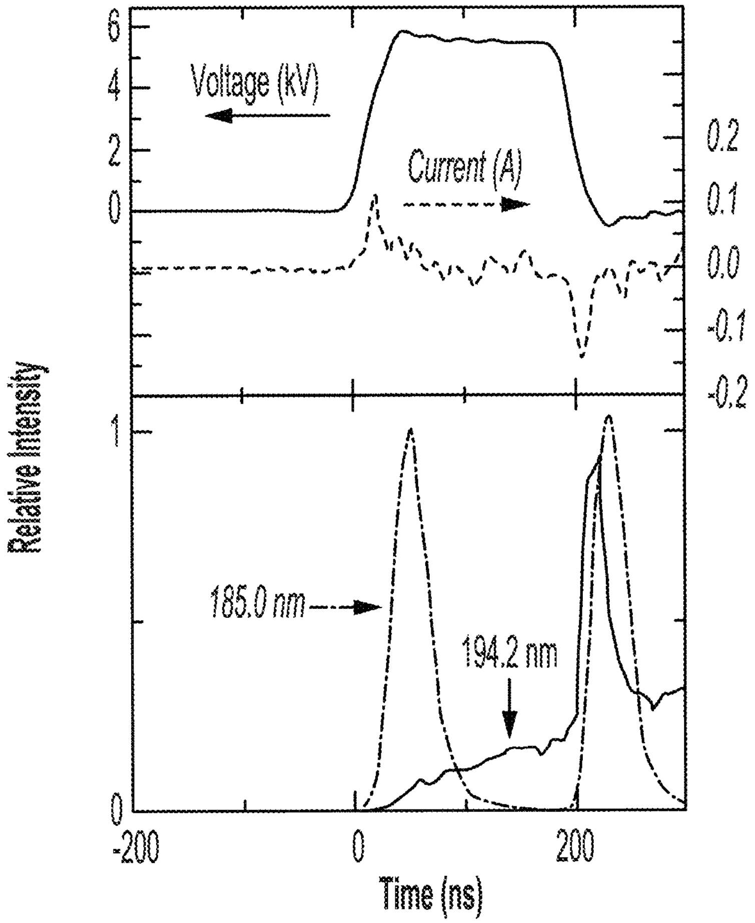
FIG. 6(*a*) illustrates a voltage and current waveform for the Hg ion lamp (upper portion of the Figure) and the relative intensities of 194.2 nm and 185.0 nm emission (lower half of the Figure), all of which were measured with the experimental arrangement of FIG. 5.
Figure 6B:
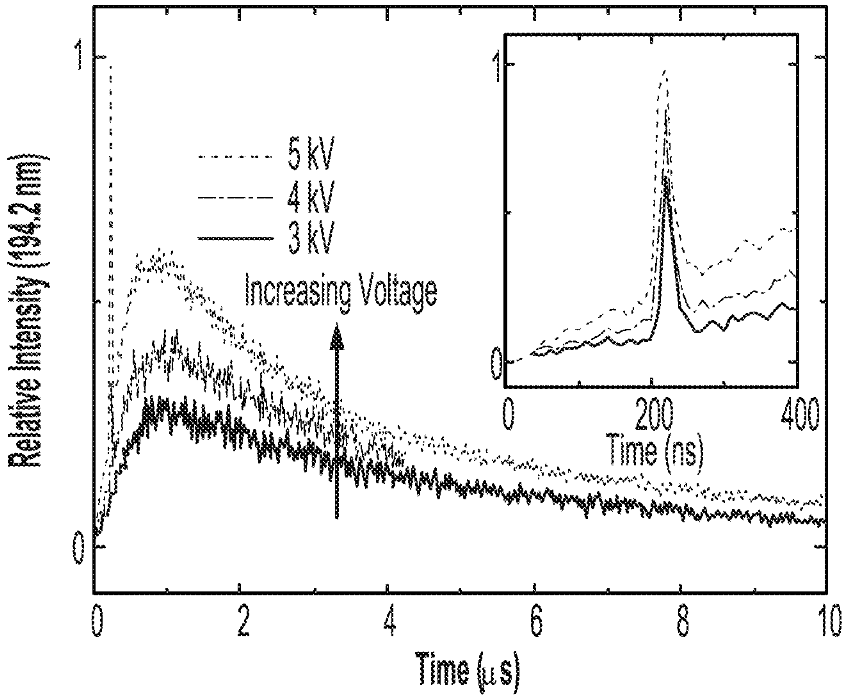

The waveforms for the discharge voltage, current, and lamp emission intensity are shown in FIGS. 6(*a*) and 6(*b*). The discharge current and voltage waveforms are shown in the top graph of FIG. 6(*a*), and the early portion of the emission waveforms for the 184.9 nm and 194.2 nm transitions of Hg and $Hg^+$, respectively, are shown in the bottom graph of FIG. 6(*a*). The 184.9 nm line of the atom is a transition of the electrically-neutral atom (as shown in FIG. 1) whereas the 194.2 nm line is generated by the ion, as discussed previously. As shown in FIG. 6(*a*), the 185 nm waveform comprises two pulses whereas the 194 nm intensity rises continuously and slowly. These data demonstrate that the 185 nm emission from neutral Hg is produced solely by direct electron impact whereas the ion emission at 194 nm results from excitation transfer from the Het dimer molecule. In particular, the slow rise of the 194 nm fluorescence intensity following the first current pulse is a signature of He dimer formation and the $He_2$*-to-$Hg^+$ excitation transfer process. To summarize, these measurements show that the strong emission lines from neutral atomic Hg is "pumped" (driven) in the lamp by electron impact excitation. In contrast, the emission lines of the Hg ion (and 194 nm, in particular) are driven exclusively by excitation transfer from the $He_2$ molecule. Further tests, showing that less than 1% of the population of the 194 nm transition upper state population is produced by electron impact, confirms the conclusion that the generation of 194 nm light occurs solely by excitation transfer from the excited $He_2$ molecule. Finally, FIG. 6(*b*) shows that, as the input voltage increases, the 194.2 nm intensity also increases.

Figure 7:
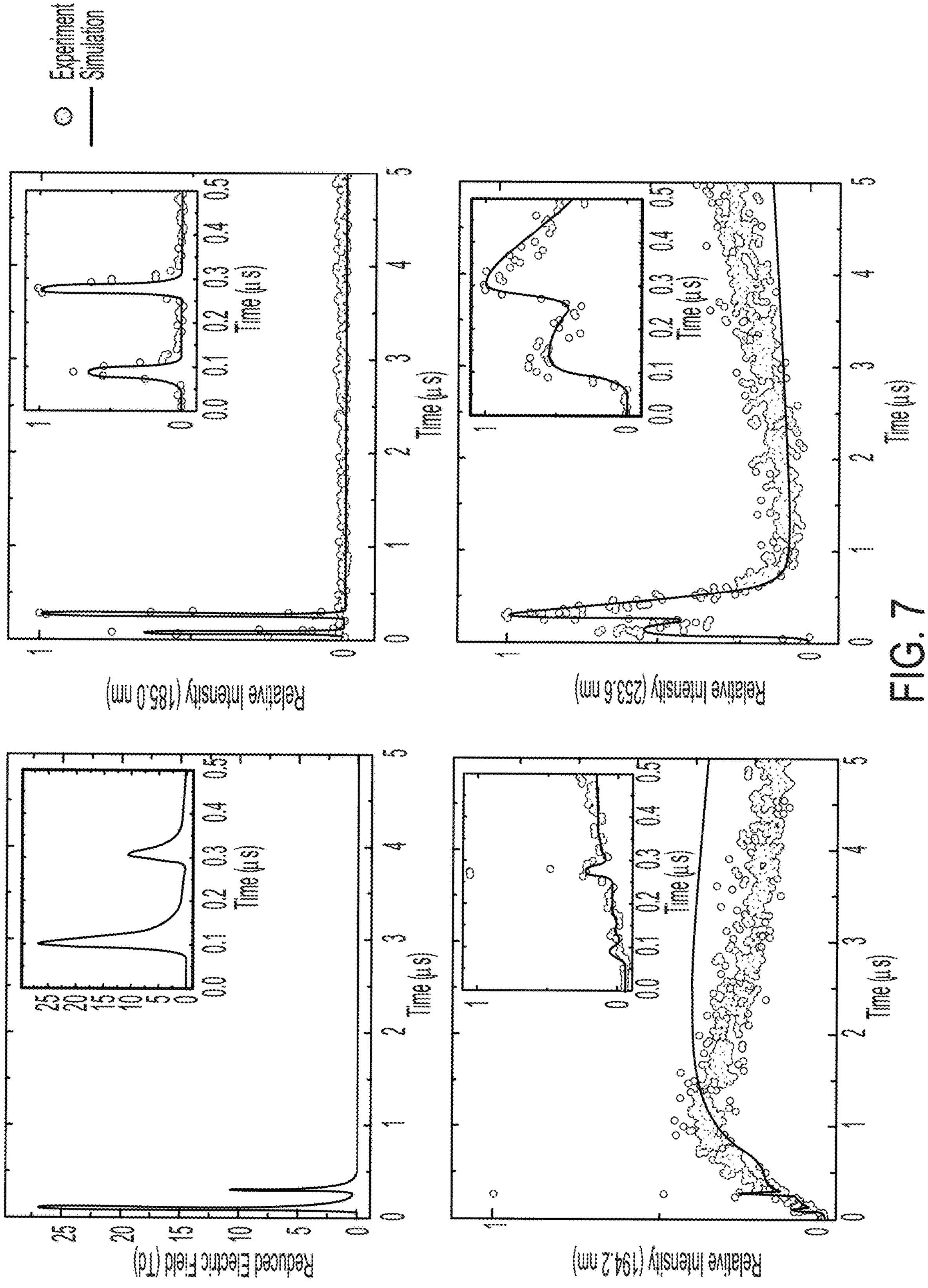
FIG. 7 compares kinetic model predictions (black line curves) with experimental data (red dots) for the waveforms associated with spontaneous emission at 185 nm (top right), 194.2 nm (lower left), and 253.7 nm (lower right).

FIG. 7 illustrates a comparison of kinetic model predictions (black line curves) with experimental data (red dots) for the waveforms associated with spontaneous emission at 185 nm (top right), 194.2 nm (lower left), and 253.7 nm (lower right). These results show that the kinetic model reproduces experimental results closely. They also show the Hg+ emission at 194 nm to be generated by an excitation transfer process whereas, as noted above, the intense 254 nm and 185 nm lines of neutral mercury are produced by direct electron impact.

Figure 8:
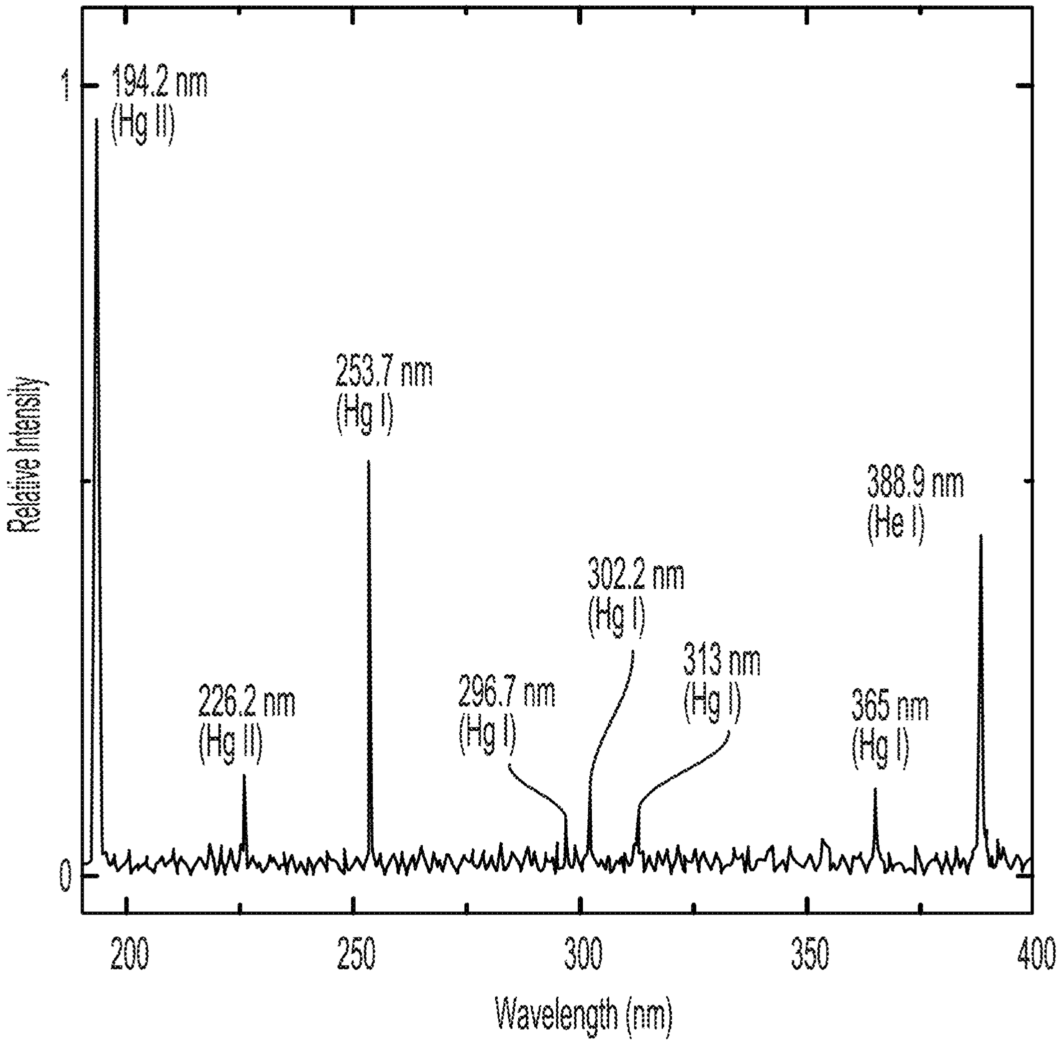
FIG. 8 is a representative spectrum of an example plasma lamp according to the present disclosure, taken after 100 hours of operation with an Hg ion lamp having a He pressure of 600 Torr He.

FIG. 8 is a spectrum representative of those recorded for multiple lamps. This spectrum was acquired with a lamp having 600 Torr of He, after the lamp had been in operation for 100 hours. The entire UV spectral region, which extends from −190 nm to 400 nm, is shown and it is evident that the 194 nm line of Hg+ is more intense than all of the neutral Hg lines, including the 253.7 nm transition. For those skilled in the art, this is a surprising result because the ion lines of Hg are not generally observed in conventional Hg discharge lamps or are extremely weak. Typically, in conventional glow discharge lamps, the 253.7 nm and 185 nm transitions are dominant in the emission spectrum because these lines originate from low-lying states of the atom (and, of course, are dipole-allowed).

Aspects of the present disclosure also provide a plasma lamp with an extended lifetime. In some examples, an interior surface of the lamp body 110 (e.g., the outer (and inner, if desired) surfaces of the internal hollow space 120 and the array of cavities 130) may be coated with a coating material. The purpose of this coating is to inhibit the diffusion of helium out of the lamp. Helium diffusion from the lamp has the effect of gradually lowering the He pressure in the lamp, thereby steadily diminishing the performance of the lamp. In some examples, the coating material may include at least one of $Al_2O_3$ and $AlN_xO_y$, diamond-like carbon, and polycrystalline diamond. In other examples, the interior surface of the lamp body 110 may be coated with any other suitable coating material. Diamond contains no oxygen for reaction with Hg which appears to be important because uncoated fused silica lamps produced a black substance within the lamps after ~100 hours of operation. This substance appears to be an oxide of mercury that is produced by the interaction of mercury ions with a fused silica ($SiO_2$) or $Al_2O_3$ surface. Another advantage of a polycrystalline diamond coating is that the lattice constant for diamond is sufficiently small so as to impede the migration of Hg into a diamond film, thereby preventing the reaction of Hg with silica, for example.

Figure 9:
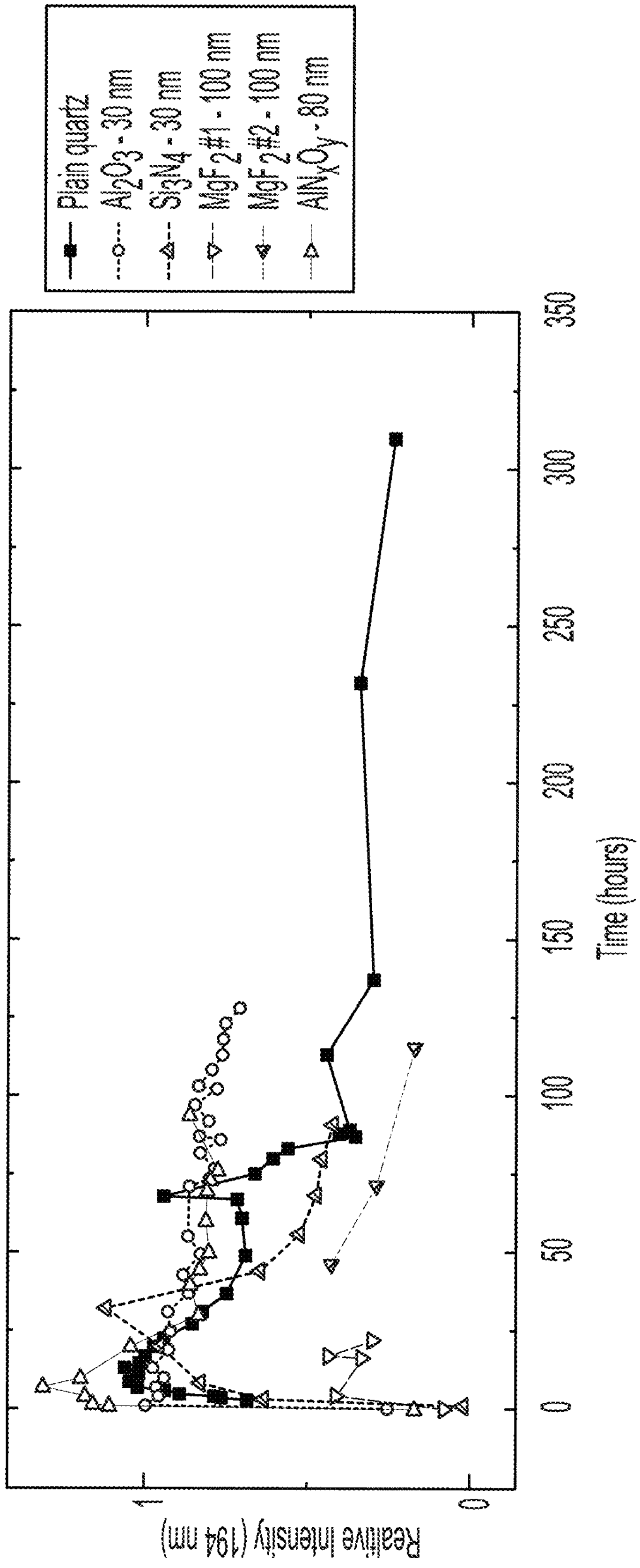
FIG. 9 is a graph illustrating showing the lifetime of 194 nm plasma lamps having different coating materials.

The impact of different coatings applied to the interior of a plasma lamp has been tested. FIG. 9 shows the impact on the lamp lifetime of depositing various films onto the surfaces (e.g., fused silica surfaces) within the plasma lamp. Of the materials tested, a 30 nm-thick film of $Al_2O_3$ deposited by atomic layer deposition (ALD) was found to be most effective in extending lamp lifetime. The aluminum oxide film also appears to slow the formation of the black film on lamp interior surfaces that appears to be an oxide of Hg. The aluminum oxide film coated onto interior wall surfaces of the lamp appears to impede the migration of Hg atoms into the surface (e.g., fused silica ($SiO_2$) surface). Similarly encouraging results were obtained with $AlN_xO_y$ (aluminum oxynitride) films 80 nm in thickness, but $Si_3N_4$ (silicon nitride) and sputtered $MgF_2$ (magnesium fluoride) films were observed to have little effect.

At present, the lifetime of the plasma lamp according to the present disclosure lies above 2000 hours. With further attention to minimizing the loss of Hg to the walls of the lamp, lifetimes approaching 20,000 hours are expected. To that end, a plasma lamp with a coating material can be baked prior to filling, Hg can be introduced into the lamp with a getter, and the walls can be coated with thicker Hg diffusion barrier films. Each of these steps are expected to extend the lifetime of the lamp.

Figure 10A:
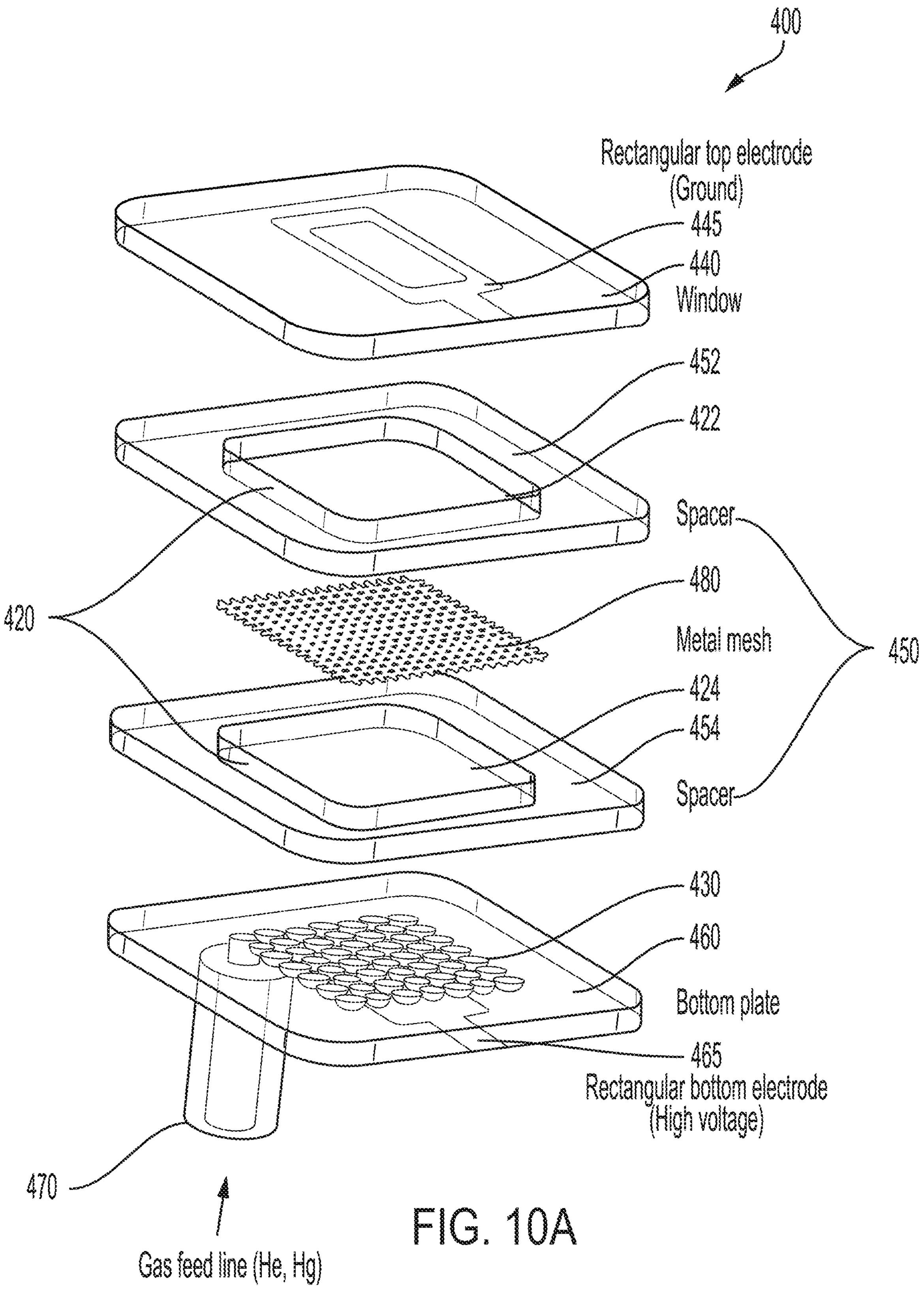
FIG. 10(*a*) is a perspective, exploded view of a schematic diagram of an example plasma lamp according to the present disclosure.
Figure 10B:
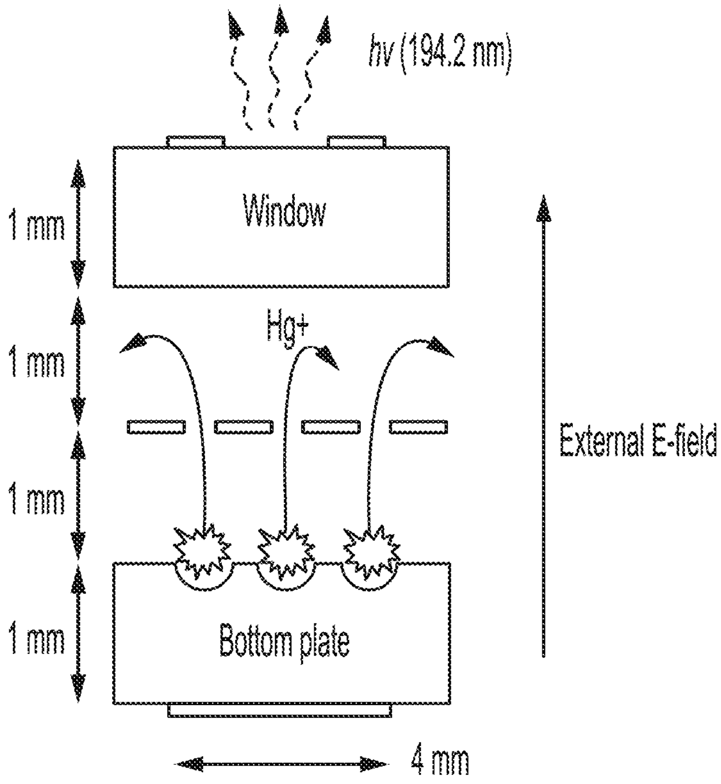
Figure 10C:
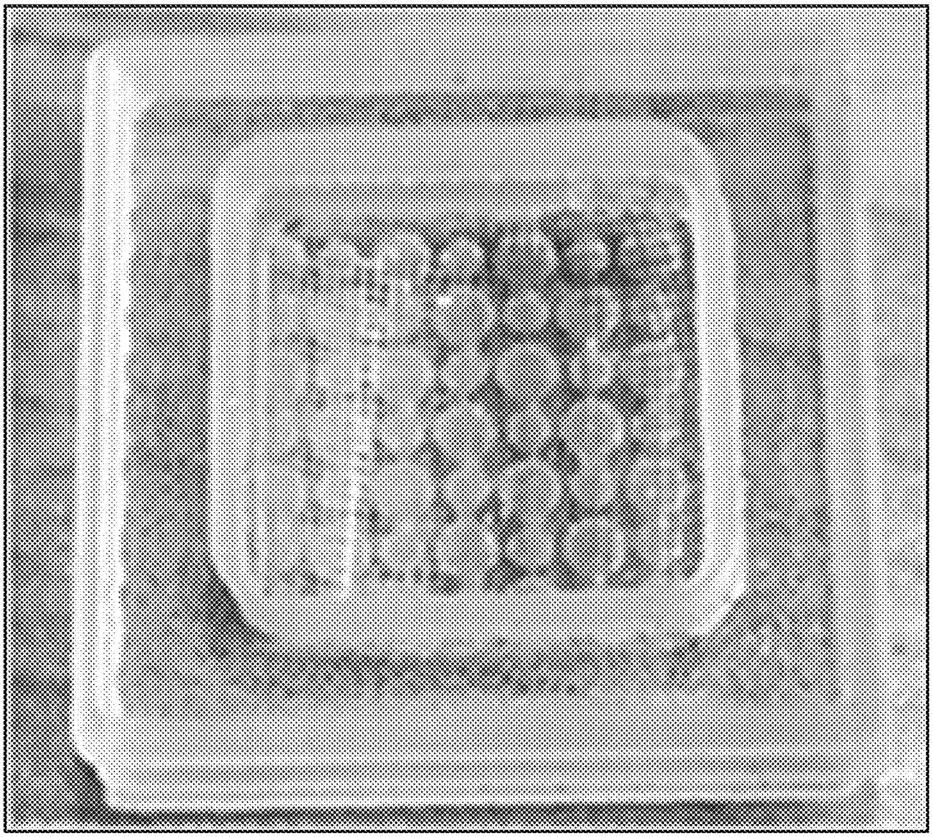

FIGS. 10(*a*) and 10(*b*) illustrate an example plasma lamp 400 according to the present disclosure. The dimension of each component illustrated in FIG. 10(*b*) is provided only as an example, and the dimension of each component is not limited thereto. The configuration/feature/characteristic of some components of the plasma lamp 400 (e.g., lamp body, internal space 420, array of cavities 430, top/window portion 440, middle/spacer portion 450, bottom portion 460, gas feeding line 470, electrodes 445, 465) may be similar to and/or the same as the ones described above with respect to plasma lamp 100 or 200 and, thus, a duplicate description is unnecessary.

The plasma lamp 400 is also able to reduce the interaction of acceptor ions ($Hg^+$ ions, for example) with the windows/top portion 440 of the plasma lamp 400. Low temperature plasma forms a sheath region between the plasma and any (internal) surface within the lamp. For example, all along the inner surface of each of the cavities 430, there exists a thin sheath region.

Within the sheath is an intense electric field directed toward the interior surfaces of the microcavities (the "wall") or other surfaces with which the plasma is in contact, such as an optical window, resulting in the acceleration of atomic or molecular ions that might be present toward the walls. In some examples, in the plasma lamp of the present disclosure, the number density of ions produced in the lamp can be exceptionally large because it is the desired radiating species. For the Hg ion lamp, for example, specific states of $Hg^+$ are the intended radiators and, accordingly, one goal of the design of such lamps is to maximize the ion number density so as to optimize the light output of the lamp. For these reasons and the efficiency of the excitation transfer process (also known as Penning ionization), the plasma lamp of the present disclosure appears to have no precedent because of the extraordinary ion number densities that it is capable of producing. The difficulty posed by this demanding environment is that the number of ions entering the sheath regions is well above those in conventional lamps. Furthermore, the sheath accelerates the ions toward the surface which either etch the surface or react chemically with it, thus producing a chemical film (discussed earlier) that reduces the transmission of the output window material. For the plasma lamp 100 of FIG. 2, for example, an electric field is directed toward the output window (top portion 140 in FIG. 2) whenever the polarity of the voltage imposed on the upper electrode 145 in FIG. 2 is negative with respect to that at the other electrode 165. During this time, the atomic or molecular ions present within the lamp 100 are accelerated toward the output window 140, which must be avoided insofar as possible. This same situation will exist for any plasma lamp in which the desired emitting species is an ion.

Aspects of the present disclosure address this issue. In some aspects of the present disclosure, the electric field produced by the voltage imposed on the lamp does not impinge on the output window/top portion, or may be weak at the window/top portion. Several approaches exist for minimizing the magnitude of the electric field strength at the surface of the output window/top portion 140.

One example approach is to provide an electrode 480 within the plasma lamp 400 (e.g., within the internal space 420). In some examples, the electrode 480 is fabricated from a conducting material, such as a metal. In other examples, the electrode 480 is made with another suitable material such as indium tin oxide (ITO) which is typically deposited onto an optical substrate as a thin film. In some examples, the electrode 480 is overcoated with a dielectric film so as to protect the electrode. In some examples, the electrode 480 may be a mesh electrode. FIG. 10(*c*) illustrates a plasma lamp with an exemplary mesh electrode according to the present disclosure. In other examples, the electrode 480 can be fabricated into any other suitable form (e.g., electrodes with internal pores, cavities, etc.). If designed properly, the mesh electrode 480 offers an optical transmission greater than 85% at the desired wavelength. That is, a mesh electrode 480 is able to transmit most of the desired UV/VUV radiation which then exits the lamp 400. However, the electric field terminates at this (mesh) electrode 480 (if the mesh electrode is grounded or biased positive) and so ions reaching the electrode 480 will pass through the electrode 480 but are attracted back to the electrode 480 by a virtual potential well. Such ions oscillate back and forth through the electrode 480 before impinging on the electrode surface. This arrangement minimizes the number of ions that reach the surface of the output window/top portion 440. Although not shown in FIG. 10(*a*), a voltage is applied to the electrode 480 and the voltage is also generally time-varying.

In some examples, the plasma lamp 400 includes the electrode 480 and the lower/second electrode 465, but does not include the upper/first electrode 445. In this case, the electrode 480 and the lower electrode 465 operate as the first/second electrodes 145 and 165. For example, the pair of electrodes 480, 465 are configured so as to apply a voltage pulse. In some examples, the voltage pulse has a pulse width in the range of about 50 ns to more than 1 microsecond.

In some examples, the spacer/middle portion 450 of the plasma lamp 400 includes a first middle portion 452 and a second middle portion 454, and the internal space 420 includes a first internal space 422 in the first middle portion 452 and a second internal space 424 in the second middle portion 454. The electrode 480 is disposed between the first middle portion 452, and the second middle portion 454 (e.g., between the first internal hollow space 422 and the second internal hollow space 424).

Some portions of the internal space 420 (e.g., second internal space 424) and the array of the cavities 430 are disposed between the first electrode 480 and the second (lower) electrode 465. The electrical power can then be delivered to the electrodes in various ways. For example, the first electrode is typically grounded and the second electrode is driven by positive (unipolar) or bipolar pulses. Bipolar voltage pulses are those in which a positive voltage pulse of desired width is immediately followed by a negative pulse. Alternatively, the second electrode may be grounded and negative voltage pulses, or bipolar voltage pulses, delivered to the first electrode.

In other examples, the plasma lamp 400 includes the upper/first electrode 445, the lower/second electrode 465, and the electrode 480. In this case, the upper/first electrode 445 repels stray ions from the interior surface of the output window/top portion 440.

Figure 11C:
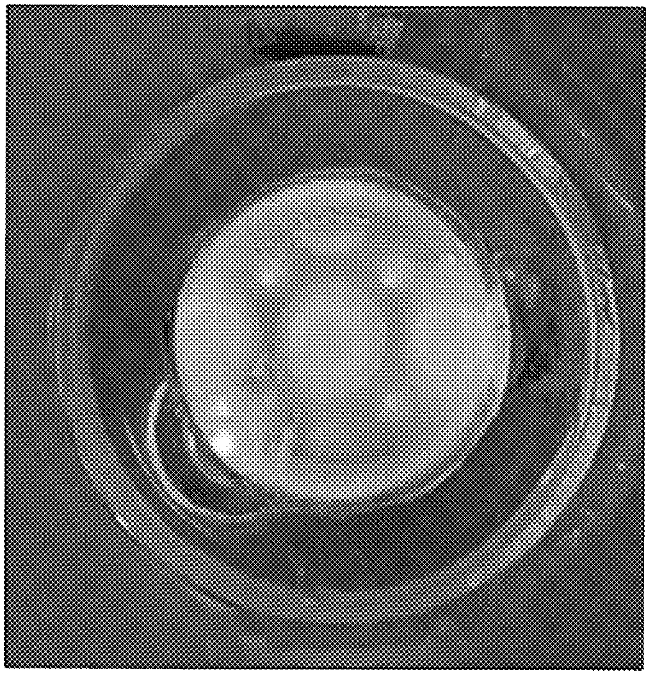
FIG. 11(*a*) illustrates a front view of a ring-electrode plasma lamp according to the present disclosure.
Figure 11A:
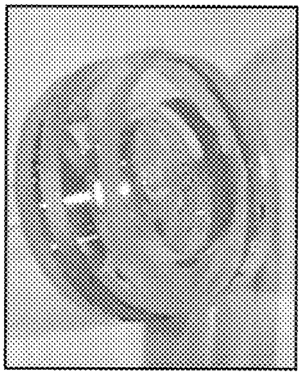
Figure 11B:
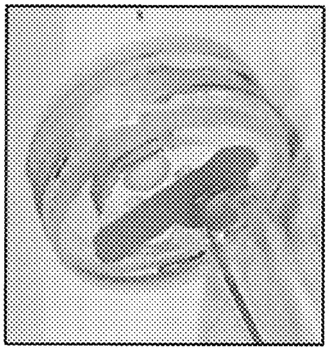

Another example approach to address the issues of the acceleration of the ions toward the window surface can be described with respect to FIGS. 11(*a*), 11(*b*), and 11(*c*). In this approach, the electric field in the region of the output window may be "flared" with a ring electrode so as to reduce the magnitude of the electric field near the window, as shown in FIGS. 11(*a*), 11(*b*), and 11(*c*). In this approach, rather than having an electrode on the output window/top portion, the electrode may, for example, be deposited as a gold "paint" around the perimeter of the cylinder. This and other electrodes may also be formed by a variety of other processes, such as evaporation, sputtering, and chemical vapor deposition with a mask. If a lamp is designed to emit primarily from ionic atomic or molecular species, the ions (such as mercury ions) may thus be deflected to the side wall of the lamp body by the electric field lines (whenever the ring electrode is positive with respect to the lower electrode located on the rear face of the lamp).

Figure 12:
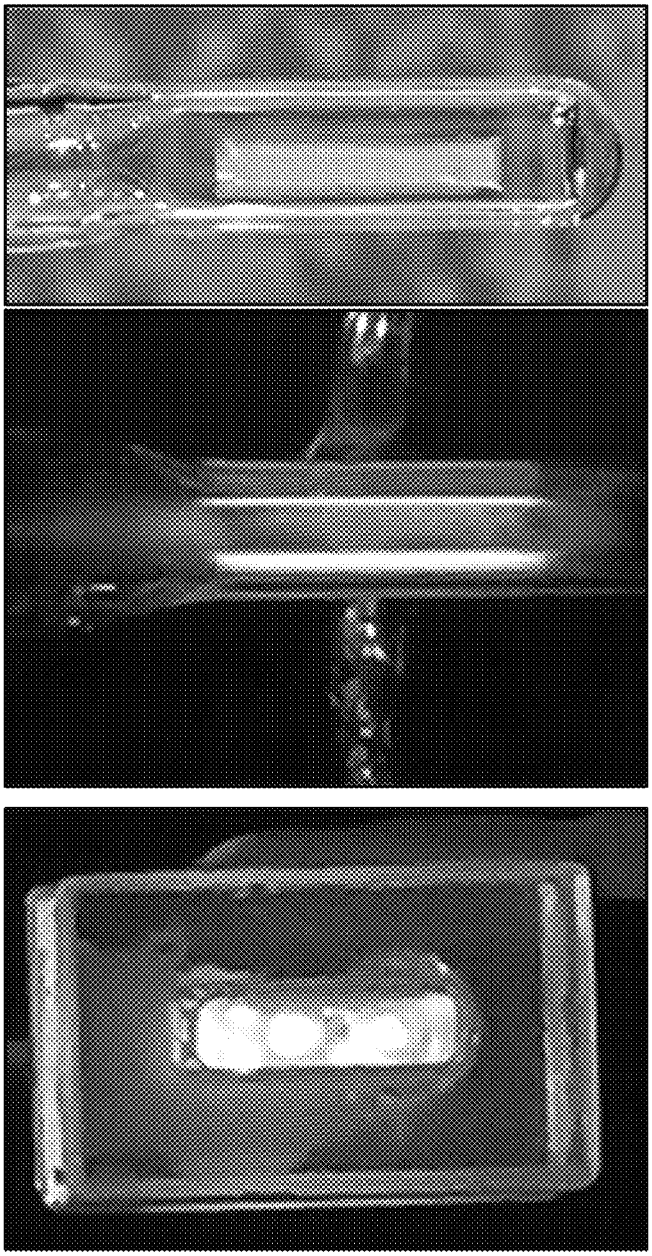
FIG. 12 illustrates photographs of various lamp structural designs: a lamp with a slit window (left); a plane-parallel electrode lamp (middle), and a rectangular lamp (right).

FIG. 12 illustrates other lamp structural designs. The lamp at left in FIG. 12 features a linear array of several microplasmas and a slit window for the purpose of matching the radiating area of the lamp to the geometry of the ion trap (a Hg ion trap, for example) if the desired application of the lamp is to drive an ion atomic clock or other ion-based device such as quantum memory. That is, the ions are confined by an ion trap, and the efficient operation of the clock may require that the VUV fluorescence produced by the lamp have a cross-section that is similar to that of the ions in the trap. The center and right-hand photographs in FIG. 12 shows a lamp having a nearly-rectangular cross-section. For the sake of simplicity, electrodes (e.g., gold electrodes) may be fabricated onto the outer surface of a tube (e.g., a quartz tube) and these electrodes have a rectangular shape. The center photo shows this lamp in operation with the electrodes oriented vertically and located on the left and right exterior surfaces of the lamp. The sheath regions on both sides of the He—Hg plasma are bright white and situated near the walls. The advantage of this design is that UV or VUV light is extracted from the lamp along a direction that is orthogonal to that for the imposed electric field.

In some examples, one of the important aspects of the lamp design is the thickness of the window and the optics by which UV/VUV radiation is transmitted to the ion trap in the clock. As discussed above, efficient coupling of the light to the ion cloud in the ion trap may require that the emission cross-section be shaped so as to have a spatial profile similar to that of the cloud. The motivation for having a slit-like window in FIG. 12 is that the RF Paul trap, which is the standard method to trap the ions in an Hg ion clock, has a cigar-shaped ion cloud. As the power consumption of the ion clock is an important parameter, efficient coupling of the lamp-generated light to the ion cloud is important.

Figure 13B:
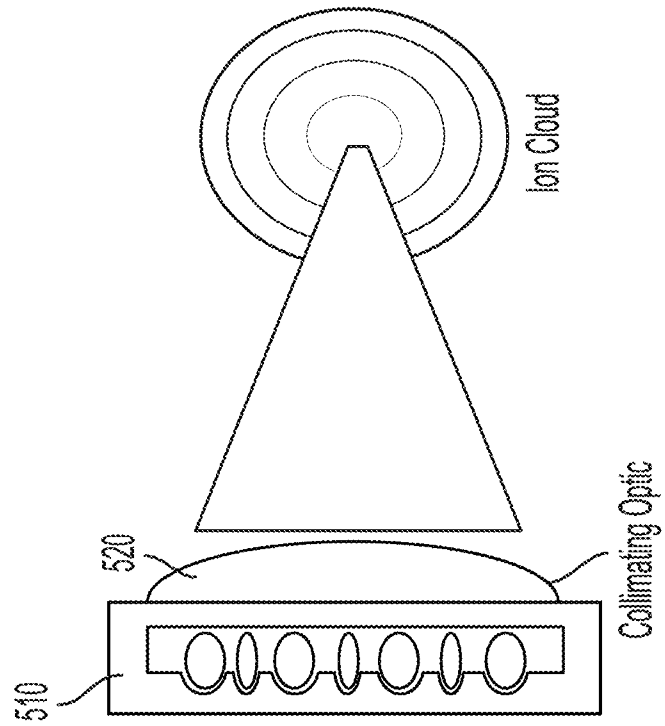
FIG. 13(*a*) illustrates a plasma lamp and a collimating optical body component on the front window of the plasma lamp according to the present disclosure.
Figure 13A:
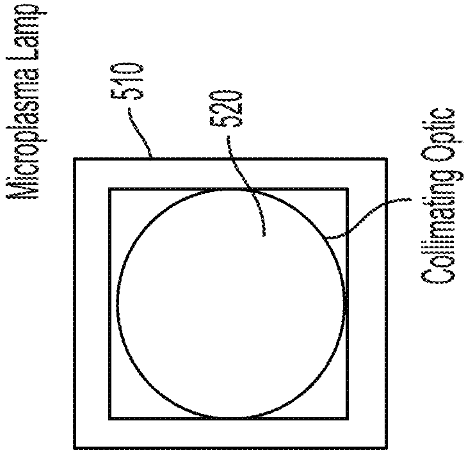
Figure 14A:
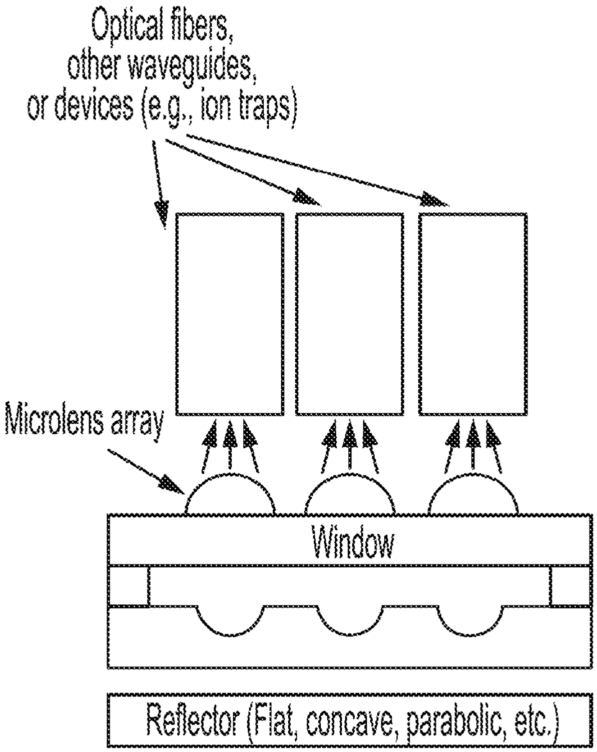
FIGS. 14(*a*)-14(*d*) illustrate various optical designs for efficiently coupling the lamp emission to an ion cloud or other assembly of atoms in an atomic clock: lamp emission collimated by a microlens array to multiple waveguides (14(*a*)); lamp emission collimated by a microlens array to a single waveguide (14(*b*)); lamp emission collected by a spherical mirror and delivered to an optical fiber or optical fiber bundle (14(*c*)); lamp emission collected by an elliptical reflector and delivered to an optical fiber, optical fiber bundle, or other optical waveguide (14(*d*)).
Figure 14B:
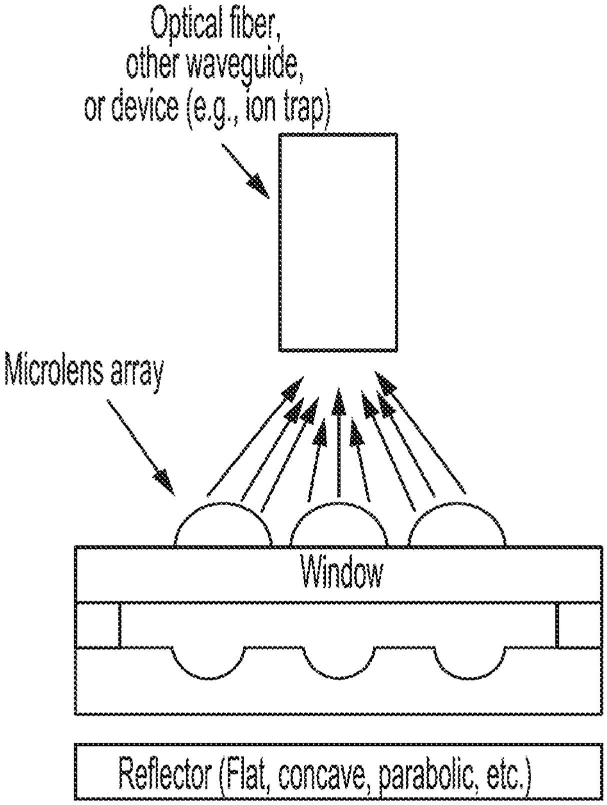
Figure 14C:
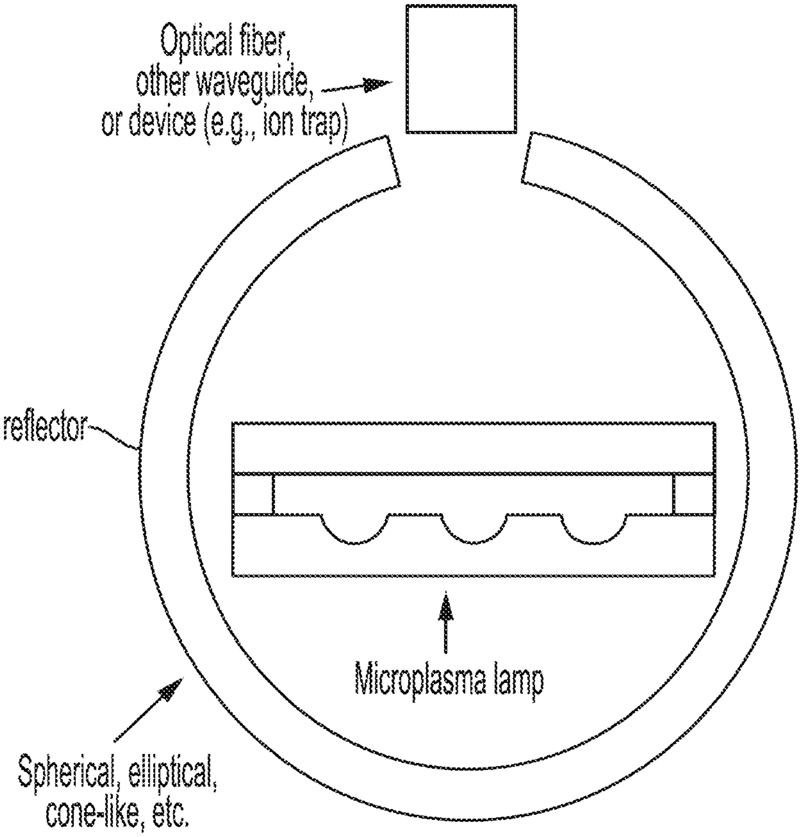
Figure 14D:
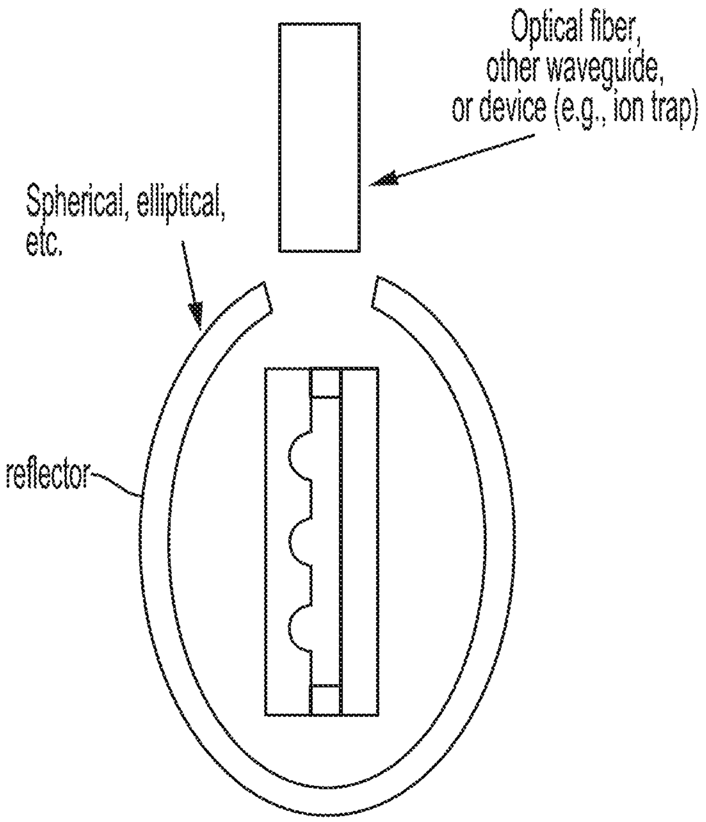
Figure 15A:
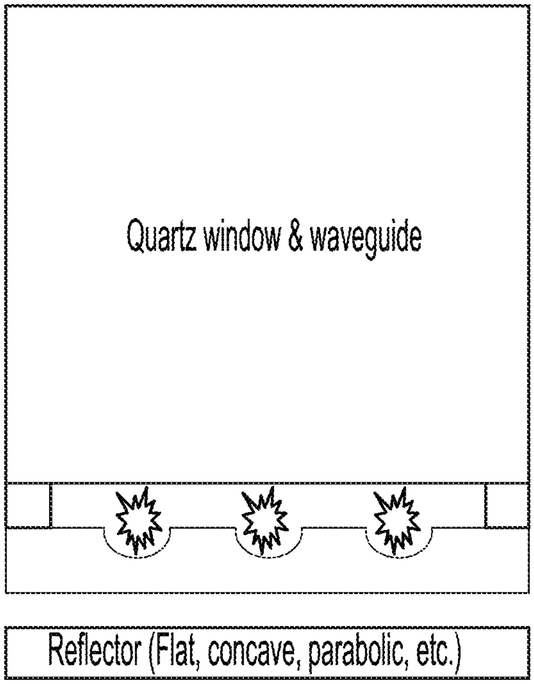
FIG. 15(*a*) is a front view of a plasma lamp that utilizes a window of the plasma lamp as a waveguide.
Figure 15B:
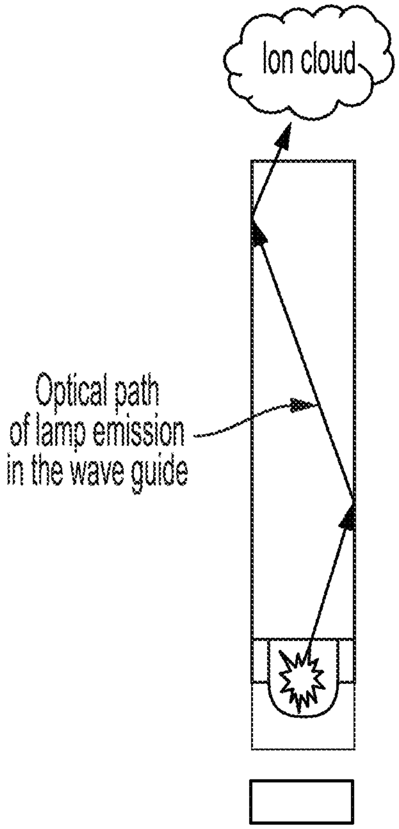

FIGS. 13-15 illustrate a series of lamp designs integrating optics as a part of lamp components or as adaptive optics to waveguide or collimate the optical beam from the lamps and deliver it to the ion cloud. Light emitted by the microplasma lamp can be coupled into a waveguiding structure that delivers light into a device or other point (surface, volume) of interest.

Optical elements such as lenses and/or specifically shaped reflectors may be used for more efficient light coupling of the lamp to the ion cloud. Optical coupling can be realized, for example, by placing a plano-convex lens on the exterior surface of the window/top portion of the plasma lamp. For example, FIGS. 13(*a*) and 13(*b*) illustrate a plasma lamp 510 and a collimating optical component 520 on the front window/top portion of the plasma lamp 510, which can be used in an ion clock. In this example, most of the photons emitted from the plasma lamp 510 may be guided (collimated) to the (HO ion cloud in the trap through the collimating optical component 520. The plasma lamp 510 may be the plasma lamp 100, 200, or 400.

Several other examples of efficient light collection/delivery methods involving optical elements are shown in FIGS. 14 to 15. For instance, having a microlens associated with each microcavity will improve the efficiency with which light emitted by the microplasmas can be collected, as shown in FIGS. 14(*a*) and 14(*b*). In FIG. 14(*a*), lamp emission is collimated by a microlens array to multiple waveguides. In FIG. 14(*b*), lamp emission is collimated by a microlens array to a single waveguide.

The schematics in FIGS. 14(*c*) and 14(*d*) illustrate designs that employ different shapes of reflecting optics. These particular designs take advantage of the ability of spherical or elliptical mirrors to efficiently collect light emitted by a lamp. Because these microplasma-driven lamps are generally small, the optics responsible for conveying light from the lamp to the desired point, line, or object plane may also be quite compact. In FIG. 14(*c*), for example, lamp emission is delivered to an optical fiber by a spherical reflector. In FIG. 14(*d*), lamp emission is delivered to an optical fiber by an elliptical reflector. Conventional UV-transmitting optical fiber, optical fiber into which one or more GRIN lenses have been integrated, photonic crystal fiber (PCF), an integrated, solid waveguide, a hollow capillary with internal or external reflective coating, or other waveguiding structures may also be employed, as shown in green in FIGS. 14(*a*), 14(*b*), 14(*c*), and 14(*d*).

In some examples, the window/top portion of the plasma lamp can, in effect, be extended to the ion cloud by the optical waveguide, as shown in FIGS. 15(*a*) and 15(*b*). Any interface between layers in a waveguide may be a source of light loss and, therefore, the designs in FIGS. 15(*a*) and 15(*b*) seek to minimize the number of interfaces between the plasma discharge and the ion cloud, which enables the efficient coupling of light. That is, the waveguide in FIGS. 15(*a*) and 15(*b*) may simply be a thin slab of fused silica, sapphire, or other VUV/deep-UV transmitting material that is polished on all faces so as to confine the lamp photons by total-internal reflection (TIR). In some examples, a thin cylindrical lens may be affixed to the "downstream" face of the waveguide so as to confine the radiation in one dimension and better approximate a line. Coupling of the emitted light into a waveguiding structure that delivers the lamp radiation to the point of interest can be beneficial for the sake of collecting efficiency, eliminating electromagnetic interference (EMI) that is generated by the lamp voltage pulses, and homogenizing the optical field. The waveguiding structure can also be capable of delivering the radiation from one lamp to multiple points of interest.

Figure 16:
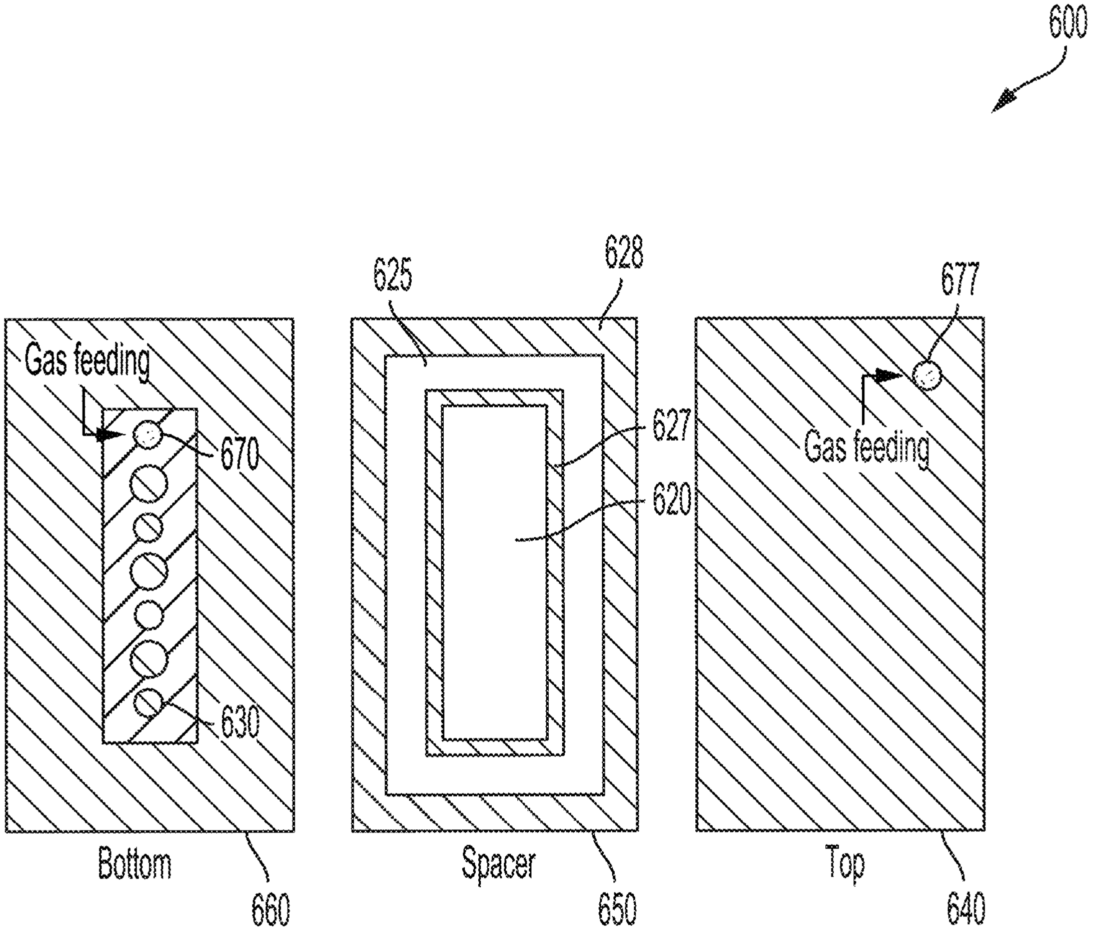
FIG. 16 is a layer-by-layer illustration of a plasma lamp according to the present disclosure, having a double jacketed lamp structure to enhance the lifetime of the plasma lamp by reducing the net diffusion of helium or another gas out of the inner portion of the lamp.
Figure 17:
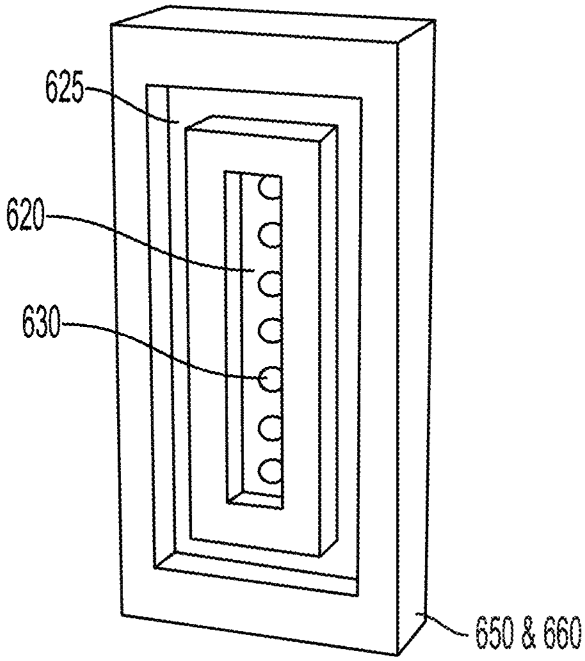
FIG. 17 is a perspective view of the middle and bottom portions of the plasma lamp of FIG. 16.
Figure 18:
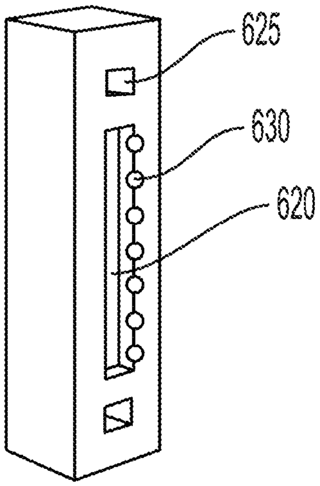
FIG. 18 is a cross-sectional view of the plasma lamp of FIG. 16.

FIG. 16 is an illustration of another exemplary plasma lamp 600 according to the present disclosure, having a double-jacketed lamp structure to enhance the lifetime of the plasma lamp. The dimension of each component illustrated in FIG. 16 is provided only as an example. FIG. 17 is a perspective view of the middle and bottom portions of the plasma lamp 600 of FIG. 16, and FIG. 18 is a cross-sectional view of the plasma lamp 600 of FIG. 16. The design of the plasma lamp 6000 was found to enhance the lifetime of the lamp by minimizing the loss of the donor gas (helium, in particular) from the lamp. The configuration and characteristics of some components of the plasma lamp 600 (such as the lamp body, internal space 620, array of cavities 630, top/window portion 640, middle/spacer portion 650, bottom portion 660, gas feeding line 670, and electrodes) may be similar to those described above with respect to the plasma lamp 100, 200, and/or 400 and will not be described further here.

In some examples, the plasma lamp 600 may further include a trench space 625 surrounding the internal space 620 that serves as a "jacket" or "vault" around the internal space 620. The trench space 625 may be filled with a donor gas such as He that is capable of diffusing through the wall (quartz, glass, sapphire, $MgF_2$, fused silica, etc.) separating the trench space 625 from the internal space 620. The pressure of the gas or vapor within the trench space 625 is set to be equal to, or greater than, the pressure of the donor gas within the internal space 620. Consequently, the diffusion of gas into the lamp's internal space will at least match the loss of gas from the internal space, thereby maintaining the pressure of He within the lamp at an approximately constant value. As discussed below, this feature of the lamp structure is most important when helium or hydrogen are employed in the lamp because the rapid diffusion of He through a wide variety of materials is well known in the art. Therefore, this feature is of less importance for heavier gases such as neon (Ne) or argon (Ar). The gas within the trench space 625 may be the same as the donor gas or, in instances in which a gradual change in the composition of the donor gas(es) in the internal space 620 is desired, different from that in the internal space. In some examples, a separate gas feeding line 677 is provided for the purpose of introducing the donor gas to the trench hollow space 625.

Because of the small size of the helium atom, it is able to diffuse quickly through a wide variety of materials. Consequently, if He serves as donor gas for a lamp, the pressure of He in the lamp generally decreases gradually with operating time as a result of the diffusion of He through the lamp enclosure. In order to minimize the loss of helium and other light gases such as hydrogen and neon, the plasma lamp 600 may be doubled-jacketed (or confined in a gas buffered housing) such that the loss of the donor (or acceptor) gas or vapor from the internal space 620 is reduced or eliminated.

In some examples, a wall 627 having a thickness of 1 to 1000 micrometers (um) may separate the internal space 620 from the trench space 625. Because the temperature of the outer wall 628 may be at or near room temperature, the loss of a donor or acceptor gas by diffusion of the gas through the wall is minimal. Also, because gas flows from higher pressure regions to lower pressure regions (i.e., counter to a pressure gradient), filling the trench space 625 with a light donor or acceptor gas (such as He) having a pressure greater than that of the donor gas in the internal space 620 will compensate for the loss of the donor or acceptor gas from the internal space 620 by diffusion.

Figure 19:
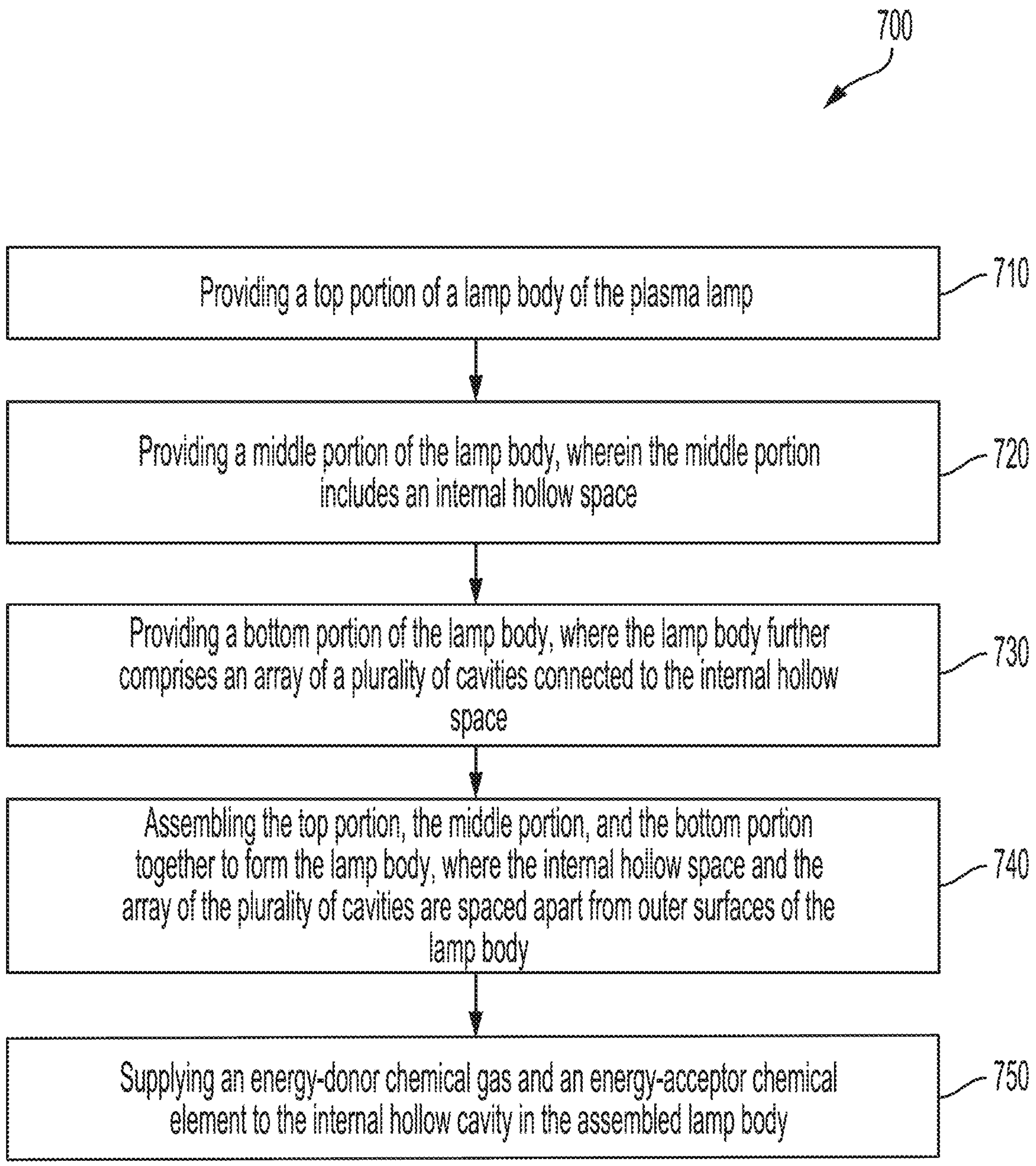
FIG. 19 is a flowchart illustrating an example method of manufacturing a plasma lamp according to the present disclosure.

FIG. 19 is a flowchart illustrating an example method 700 for manufacturing a plasma lamp according to the present disclosure. Although the example method 700 is described with reference to the flowchart illustrated in FIG. 19, it will be appreciated that other methods of performing the steps associated with the method 700 may be used.

In the illustrated example, the method 700 of manufacturing a plasma lamp includes providing a top portion of a lamp body of the plasma lamp (block 710), providing a middle portion of the lamp body (where the middle portion includes an internal hollow space (block 720)), and providing a bottom portion of the lamp body in which the lamp body further includes at least one array of microcavities situated within the internal space (block 730). The method 700 further includes assembling the top portion, middle portion, and the bottom portion together to form the lamp body, where the internal space and the array of cavities are spaced apart from outer surfaces of the lamp body (block 740). The method 700 may also include supplying donor and acceptor gas(es) or vapor(s) to the internal cavity in the assembled lamp body (block 750).

The method 700 may further include sealing the lamp body with a sealing material (such as glass frit) capable of yielding a robust, long-lived lamp. The method 700 may also include coating an interior surface of the lamp body with a film of a material such as $Al_2O_3$ or $AlN_xO_y$, diamond-like carbon, and polycrystalline diamond.

In some examples, the plasma lamp may include a trench or "vault" space surrounding the internal space. The method 700 may further include supplying one or more gases or vapors to the trench space. The pressure of the gas within the trench space is set to be equal to, or greater than, the pressure of the donor and/or acceptor gases within the internal space.

In some examples, a method of manufacturing an atomic clock is provided. The method may include the manufacture of a plasma lamp with the method discussed above (e.g., method 400), providing an optical component or components configured to collimate the radiation from the plasma lamp and deliver the collimated radiation to an ion cloud, and assembling the plasma lamp and optical components to form the optical driver for the atomic clock.

Detailed descriptions of certain non-limiting embodiments according to the present disclosure are disclosed in Exhibit A (also available as Appl. Phys. Lett. 119, 044001 (2021)) and Exhibit B (also available as S Park et al 2022 Plasma Sources Sci. Technol. 31 045007) that are filed with U.S. Provisional Application No. 63/399,876 filed Aug. 22, 2022, and entitled "ULTRAVIOLET AND VACUUM ULTRAVIOLET LAMPS DRIVEN BY MOLECULAR-ATOMIC, ATOMIC-ATOMIC, OR ATOMIC-MOLECULAR EXCITATION TRANSFER," the disclosure of each of which is incorporated herein by reference.

In the present disclosure, the terms "including" and "comprising" are used in an open-ended fashion, and thus should be interpreted to mean "including, but not limited to . . . ." All ranges described are intended to include all numbers, whole or fractions, contained within the said range. As used herein, "about," "approximately," and "substantially" are understood to refer to numbers in a range of numerals, for example, the range of −10% to +10% of the referenced number, preferably −5% to +5% of the referenced number, more preferably −1% to +1% of the referenced number, most preferably −0.1% to +0.1% of the referenced number. Moreover, these numerical ranges should be construed as providing support for a claim directed to any number or subset of numbers in that range.

References throughout the specification to "various aspects," "some aspects," "some examples," "other examples," or "one aspect" means that a particular feature, structure, or characteristic described in connection with the specific aspect is included in at least one example. Thus, appearances of the phrases "in various aspects," "in some aspects," "certain embodiments," "some examples," "other examples," "certain other embodiments," or "in one aspect" in places throughout the specification are not necessarily all referring to the same aspect. Furthermore, the particular features, structures, or characteristics illustrated or described in connection with one example may be combined, in whole or in part, with features, structures, or characteristics of one or more other aspects without limitation.

It is to be understood that at least some of the figures and descriptions herein have been simplified to illustrate elements that are relevant for a clear understanding of the disclosure while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements may not be provided herein.

The terminology used herein is intended to describe particular embodiments only, and is not intended to be limiting of the present disclosure. As used herein, the singular forms "a," "an," and "the" are intended to include the plural forms as well, unless otherwise indicated. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "at least one of X or Y" or "at least one of X and Y" should be interpreted as X, or Y, or X and Y.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A plasma lamp comprising:

a lamp body comprising:

a top portion;

a middle portion having an internal hollow space filled with an energy-donor atomic or molecular gas and an energy-acceptor chemical atomic or molecular gas or vapor; and a bottom portion;

wherein the lamp body further comprises an array of a plurality of microcavities fabricated within the internal hollow space, wherein the internal hollow space and the array of the plurality of cavities are spaced apart from outer surfaces of the lamp body;

wherein the plasma lamp is configured to excite the energy-donor chemical gas by an ignition of a plasma within the internal hollow space;

wherein energy is transferred from the donor atomic or molecular species to the acceptor atomic or molecular species by a collision which results in light being emitted by specific states of the acceptor atom or molecule.

2. The plasma lamp of claim 1, wherein the array of a plurality of cavities comprises a first group of cavities and a second group of cavities, wherein the first group of cavities has a first width or diameter and the second group of cavities has a second width or diameter, which is greater than the first width or diameter.

3. The plasma lamp of claim 1, wherein the energy-donor gas comprises helium, neon, argon, or nitrogen gas, or a mixture thereof.

4. The plasma lamp of claim 1, wherein the donor gas is helium (He), the energy-acceptor chemical element is mercury (Hg) vapor, and VUV light is generated at 194 nm.

5. The plasma lamp of claim 1, wherein the energy-donor chemical gas in the internal hollow space is at a pressure in a range of about 50 Torr to about 3000 Torr.

6. The plasma lamp of claim 1, wherein the energy-acceptor chemical is mercury, cadmium, zinc, sulfur, phosphorus, selenium, barium, calcium, lithium, sodium, potassium, rubidium, cesium, or francium vapor, or oxygen or nitrogen gas, or mixtures thereof.

7. The plasma lamp of claim 1, comprising a pair of electrodes to generate the plasma.

8. The plasma lamp of claim 6, wherein the pair of electrodes is configured to apply a voltage pulse having a pulse width in a range of about 50 ns to 1000 ns.

9. The plasma lamp of claim 7, wherein a rise and/or fall time of the voltage pulse is less than about 100 ns.

10. The plasma lamp of claim 6, wherein the pair of electrodes comprise a first electrode and a second electrode.

11. The plasma lamp of claim 9, wherein the first electrode is disposed in the top portion and the second electrode is disposed in the bottom portion.

12. The plasma lamp of claim 9, wherein the first electrode is disposed in the middle portion and the second electrode is disposed in the bottom portion, wherein the first electrode comprises a mesh electrode.

13. The plasma lamp of claim 9, further comprising a mesh electrode disposed in the middle portion.

14. The plasma lamp of claim 1, wherein an interior surface of the lamp body is coated with a coating material, wherein the coating material comprises at least one of $Al_2O_3$ and $AlN_xO_y$, diamond-like carbon, and polycrystalline diamond.

15. The plasma lamp of claim 1, wherein the array of the plurality of cavities is disposed in the bottom portion of the lamp body.

16. The plasma lamp of claim 1, further comprising a trench hollow space surrounding the internal hollow space, wherein the trench hollow space is filled with a chemical gas, wherein a pressure of the chemical gas within the trench hollow space is greater than the pressure of the energy-donor chemical gas within the internal hollow space.

17. The plasma lamp of claim 16, wherein the chemical gas comprises the energy-donor chemical gas.

18. The plasma lamp of claim 16, wherein at least one of the top portion, the middle portion, and the bottom portion is made with fused silica, quartz, glass, magnesium fluoride, calcium fluoride or sapphire.

19. A plasma lamp comprising:

a lamp body comprising:

an internal hollow space filled with an energy-donor chemical gas and an energy-acceptor chemical element; and an array of a plurality of cavities connected to the internal hollow space, wherein the internal hollow space and the array of the plurality of cavities are spaced apart from outer surfaces of the lamp body;

wherein the plasma lamp is configured to excite the energy-donor chemical gas by the ignition of an array of microplasmas within the internal hollow space;

wherein energy is transferred from the donor atomic or molecular species to the acceptor atomic or molecular species by a collision which results in light being emitted by the acceptor atom or molecule.

20. The optical driver for an atomic clock comprising:

the microplasma lamp of claim 1; and an optical element such as a conventional, GRIN, or a Fresnel lens, or a single fiber, or a bundle of optical fibers is configured to collimate the radiation from the plasma lamp and deliver the collimated radiation to an ion cloud.

* * * * *